(12) United States Patent
Smith et al.

(10) Patent No.: US 11,781,937 B1
(45) Date of Patent: Oct. 10, 2023

(54) VALVE SEAL INTEGRITY VERIFICATION SYSTEMS AND METHODS

(71) Applicant: DURASEAT LLC, Brookshire, TX (US)

(72) Inventors: Gordon M. Smith, Brookshire, TX (US); Logan T. Smith, Brookshire, TX (US); Dave B. Keiser, Seguin, TX (US)

(73) Assignee: DURASEAT LLC, Brookshire, TX (US)

( * ) Notice: Subject to any disclaimer, the term of this patent is extended or adjusted under 35 U.S.C. 154(b) by 0 days.

(21) Appl. No.: 18/126,421

(22) Filed: Mar. 25, 2023

Related U.S. Application Data

(60) Provisional application No. 63/323,909, filed on Mar. 25, 2022.

(51) Int. Cl.
    *G01M 3/28* (2006.01)
    *F16K 5/04* (2006.01)
    (Continued)

(52) U.S. Cl.
    CPC ......... *G01M 3/2815* (2013.01); *F16K 5/0407* (2013.01); *F16K 5/184* (2013.01); *F16K 15/00* (2013.01); *F16K 37/0091* (2013.01)

(58) Field of Classification Search
    CPC . G01M 3/2815; G01M 3/2876; F16K 5/0407; F16K 5/184; F16K 15/00; F16K 37/0091
    (Continued)

(56) References Cited

U.S. PATENT DOCUMENTS 2,612,340 A * 9/1952 Laurent .................. F16K 5/185
                                           137/246.13
3,011,513 A * 12/1961 Heinen ................. F16K 5/0271
                                           251/166
(Continued)

FOREIGN PATENT DOCUMENTS

CN     108 087 576     5/2018
EP     0 991 888       4/2000
(Continued)

OTHER PUBLICATIONS

Notification of Transmittal of Int'l Search Report and Written Opinion of ISA (PCT/US2023/016347) dated Jul. 19, 2023.

*Primary Examiner* — Minh Q Le
(74) *Attorney, Agent, or Firm* — Quisenberry Law PLLC

(57) ABSTRACT

Improved valve seal and integrity systems and methods are disclosed. Pressure in an internal cavity of a valve may be monitored and stored to assist in determining whether one or more seals in the valve are leaking. Internal cavity temperature may also be recorded and monitored to assist in determining whether there are any valve seal leaks. Expected pressure corresponding to a detected internal cavity pressure (that may be determined by correlating temperature and known fluid properties) may be compared to detected internal cavity pressure to assist in determining the existence of valve leaks. Internal cavity pressures and pressure differentials over time may be used to determine remaining valve seal life, leak severity, and/or integrity of a check valve on the valve. Indications of seal life, leak severity, seal integrity, and/or check valve integrity may be displayed to an end user or otherwise provided to a database or computer.

20 Claims, 15 Drawing Sheets

(51) Int. Cl.
*F16K 37/00* (2006.01)
*F16K 15/00* (2006.01)
*F16K 5/18* (2006.01)

(58) Field of Classification Search
USPC .................. 137/15.11, 487.5, 250, 557, 559;
251/195, 203, 204, 207, 214; 166/337
See application file for complete search history.

(56) References Cited

U.S. PATENT DOCUMENTS

| | | | | |
|---|---|---|---|---|
| 4,623,119 | A * | 11/1986 | van der Wiel | F16K 5/162 251/188 |
| 5,011,115 | A * | 4/1991 | Smith | F16K 5/185 251/188 |
| 5,385,332 | A * | 1/1995 | Smith | F16K 5/0407 251/283 |
| 5,542,644 | A * | 8/1996 | Smith | F16K 5/185 251/188 |
| 5,947,443 | A * | 9/1999 | Shellenbarger | F16K 5/0478 251/181 |
| 9,638,337 | B2 * | 5/2017 | Witkowski | B23P 15/001 |
| 9,897,223 | B1 * | 2/2018 | Roberts | F16K 25/00 |
| 9,897,240 | B2 * | 2/2018 | Kearns | F16L 55/105 |
| 10,927,964 | B2 * | 2/2021 | Patil | F16K 5/0471 |
| 2008/0142752 | A1 * | 6/2008 | Matzner | F16K 5/0464 251/310 |
| 2013/0270472 | A1 * | 10/2013 | Crochet, Sr. | F16K 41/026 251/214 |
| 2016/0305594 | A1 | 10/2016 | Mulloy | |
| 2017/0002934 | A1 * | 1/2017 | Such | F16K 17/0406 |
| 2017/0315015 | A1 * | 11/2017 | Weidner | G01L 9/0072 |
| 2018/0142797 | A1 * | 5/2018 | Roberts | F16K 5/0407 |
| 2022/0050005 | A1 * | 2/2022 | Clarke | G01M 3/2815 |

FOREIGN PATENT DOCUMENTS

| | | |
|---|---|---|
| WO | WO 99/00619 | 1/1999 |
| WO | WO 2006/024860 A1 | 3/2006 |

* cited by examiner

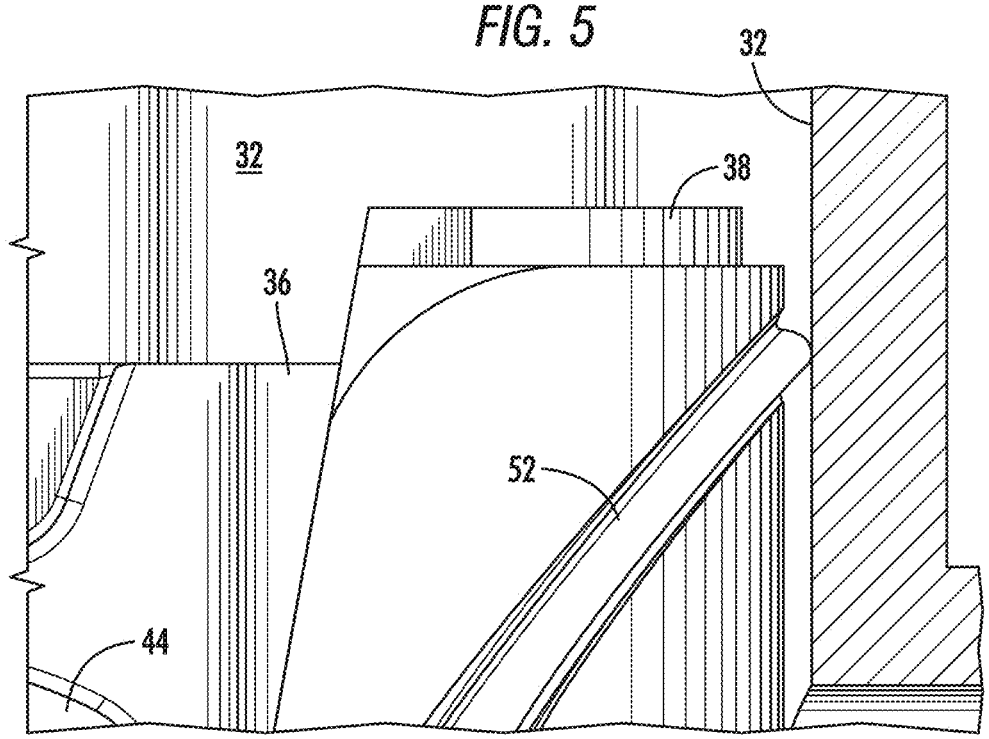
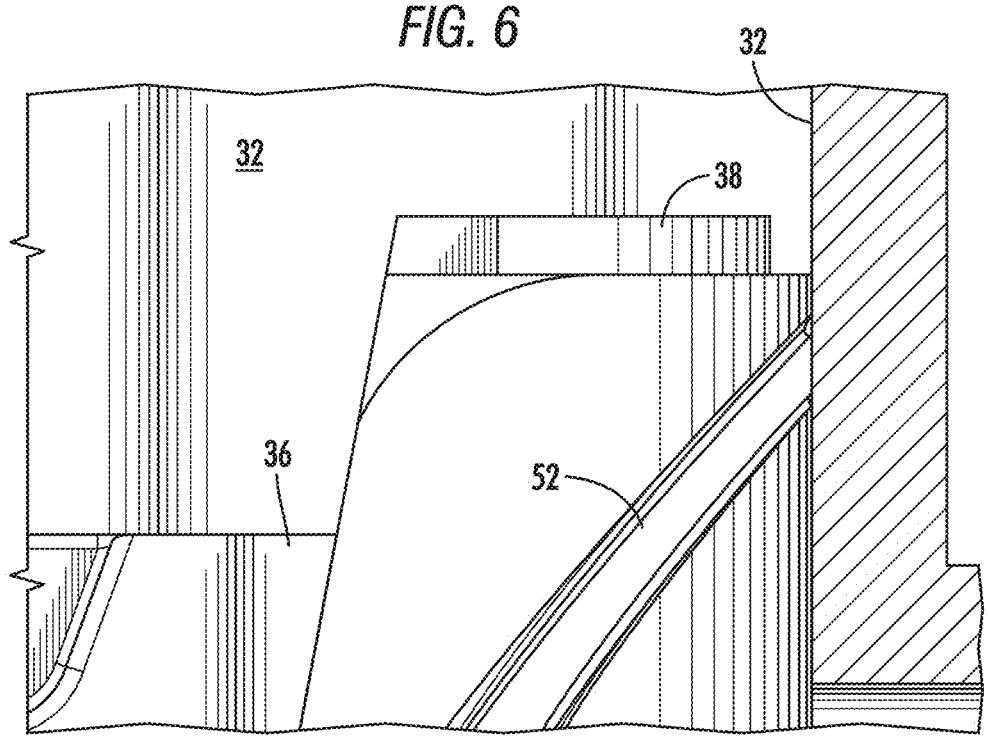

VALVE SEAL INTEGRITY VERIFICATION SYSTEMS AND METHODS

RELATED APPLICATIONS

This application claims the benefit of U.S. Provisional Application No. 63/323,909, filed Mar. 25, 2022, the contents of which are fully incorporated herein by reference.

BACKGROUND OF THE INVENTIONS

1. Field of the Inventions

The present inventions generally pertain to valve equipment, and more particularly to improved valve systems and methods for detecting leaks in valve seals.

2. Description of the Related Art

The use of valves to control fluid flow through conduits in the oil and gas industry is well known. For example, it is not uncommon for oil and gas refineries to have row after row of holding tanks to hold various fluids, such as crude oil. These tanks are in fluid communication with conduits that are used to communicate fluids to other parts of a refinery, for example, for one or more refining processes. Valves are used in these conduits to open and close various conduits to permit or restrict fluid flow from various locations. For example, a storage tank may have an access conduit that leads from the storage tank to a central conduit that is used to communicate fluids to other parts of a refinery. It is well known to place two valves in series in the access conduit, and place a bleed valve in the section of the access conduit between the two valves. This is referred to in the industry as a double block-and-bleed system. When it is desired to restrict flow through the access conduit, both valves are closed. The bleed valve between the two control valves is then opened so that any fluid and pressure in the access conduit between the two valves is allowed to escape. If only a small amount of fluid escapes and then fluid flow stops from the bleed valve, then that shows that the seals in the two valves are sound and functioning properly. However, if fluid continues to flow under pressure through the bleed valve, then that shows that seal integrity has failed and seal repair must take place before further attempts to move fluid into or out of the storage tank.

The next step forward in this art was Joseph Heinen's development of a single valve with a double block and bleed system incorporated therein. This type of valve is generally known in the industry as a double block and bleed expanding plug valve. These valves include two internal seals that are sometimes referred to as an upstream seal and a downstream seal, which together function like the two valves in the precursor double block and bleed system described above.

The present inventions have been conceived and developed to provide improved valve systems and methods to assess seal integrity, and to do so by directly checking seal integrity of a single double block and bleed expanding plug valve through pressure monitoring. The manner in which the present inventions achieve these objectives will become apparent from the following descriptions and explanations provided below.

SUMMARY OF THE INVENTIONS

In one aspect, the present inventions may encompass a double block and bleed expanding plug valve that includes a pressure sensor adapted to sense pressure within an internal cavity of the plug valve. The pressure may be monitored at various stages of use of the plug valve, including before, during and after the plug valve is moved from an open position to a closed or fully-seated position, including: when upstream and downstream internal slip seals make initial contact with an inner bore of the valve, when upstream and downstream slips and their corresponding seals make seating contact with the inner bore (at which time the plug valve is in a closed or fully-seated position), and after the slips and seals are moved into their fully-seated positions. In operation, at the moment the slip seals make initial contact with the inner bore, a first volume $V_1$ is defined within the internal cavity and a corresponding first pressure $P_1$ is identified. As the internal slips continue to move radially outwardly toward the inner bore and the slip seals are being compressed against the inner bore, the volume within the cavity is gradually expanding and the pressure is gradually dropping, assuming there are no seal leaks. As the internal slips and slip seals make fully-seated contact with the inner bore, a second volume $V_2$ is defined within the cavity, and a corresponding second pressure $P_2$ is identified within the internal cavity. As described in more detail below, in a specific embodiment of a system according to the present inventions, the system may confirm that the second pressure $P_2$ is less than the first pressure $P_1$. If not, then that is an indication of seal failure, at which time the necessary maintenance may take place. But if the second pressure $P_2$ is less than the first pressure $P_1$, the system may continue to monitor the cavity pressure to determine its magnitude relative to the second pressure $P_2$. If the pressure stays constant at the second pressure $P_2$ then that is an indication that there are no leaks and an indication that the seals are functioning properly. However, if the pressure does not remain constant, then that is an indication of a seal leak, at which time necessary seal repair maintenance may take place. Additional details concerning pressure monitoring are discussed below.

In another aspect, the present inventions may include a valve system comprising: a valve, and a processor, the valve including a main body member, a valve member, a trunnion, and a pressure sensor, the main body member having a first port, a second port, an internal cavity, and an inner bore, the valve member including a valve plug, a first slip member and a second slip member, the valve plug having a transverse passageway adapted for alignment with the first port and the second port in an open position, the first slip member being secured to a first side of the valve plug and disposed for radial movement relative to the valve plug, the second slip member being secured to a second side of the valve plug and disposed for radial movement relative to the valve plug, the first slip member including a first slip member seal, the second slip member including a second slip member seal, the trunnion being connected to the valve plug, the trunnion being adapted to rotate the valve plug relative to the main body member, move the valve plug up and down relative to the main body member to cause movement of the first slip member and the second member into and out of sealing engagement with the inner bore, the first and second slip members being in a first position when the first and second slip member seals move into initial contact with the inner bore when the valve plug is moving from an open position to a closed position, the first and second slip members being in a second position when the first and second slip members and the first and second slip member seals move into fully seated engagement with the inner bore to define a closed position of the valve plug, the internal cavity of the main body member being initially sealed from the first port and second port in the main body member when the first slip member seal and the second slip member seal make initial sealing contact with the inner bore, the pressure sensor being mounted to the main body member and in communication with the internal cavity, the processor being adapted to determine a first pressure in the cavity when the first and second slip member seals make initial contact with the inner bore, the processor being adapted to determine a second pressure in the cavity when the first and second slip members and the first and second slip member seals move into fully seated engagement with the inner bore, the processor further being adapted to determine whether the second pressure is less than the first pressure, to provide an indication of a leak if the second pressure is not less than the first pressure, to determine whether the second pressure remains constant if the second pressure is less than the first pressure, to provide an indication of a leak if the second pressure does not remain constant, and to provide an indication of no leak if the second pressure remains constant. Another feature of this aspect of the present inventions may be that the valve further includes a temperature sensor mounted to the main body and in communication with the internal cavity. Another feature of this aspect of the present inventions may be that the processor is adapted to: continuously monitor and record the internal cavity pressure when the valve is in its open position; detect and record the internal cavity pressure and the internal cavity temperature when the first and second slip member seals move into initial contact with the inner bore when the valve plug is moving from its open position to its closed position; detect and record the internal cavity pressure and the internal cavity temperature when the first and second slip member seals move into fully seated engagement with the inner bore; determine whether the internal cavity pressure is remaining constant; if the internal cavity pressure is remaining constant, then determine whether the internal cavity temperature is changing over time; if the internal cavity temperature is not changing over time, then provide an indication that the seals are not leaking; if the internal cavity temperature is changing over time, then provide an indication that at least one of the seals is leaking; if the internal cavity pressure is not remaining constant, then determine whether the change in internal cavity pressure is due to a change in internal cavity temperature only; if the change in internal cavity pressure is not due to a change in internal cavity temperature only, then provide an indication that at least one of the seals is leaking; and if the change in internal cavity pressure is due to a change in internal cavity temperature only, then provide an indication that the seals are not leaking. Another feature of this aspect of the present inventions may be that to perform the step of determining whether the change in internal cavity pressure is due to a change in the internal cavity temperature, the processor is adapted to: for a given detected internal cavity temperature and corresponding detected internal cavity pressure, determine what the expected internal cavity pressure corresponding to detected internal cavity temperature should be; compare the detected internal cavity pressure to the expected internal cavity pressure; if the expected internal cavity pressure equals the detected internal cavity pressure, then provide an indication that the seals are not leaking; and if the expected internal cavity pressure does not equal the detected internal cavity pressure, then provide an indication that the seals are leaking. Another feature of this aspect of the present inventions may be that to perform the step of determining what the expected internal cavity pressure corresponding to detected internal cavity temperature should be, the processor is adapted to: access from a database at least one fluid property of at least one of a fluid and a fluid mixture flowing through the valve; and use the at least one fluid property to determine the expected internal cavity pressure corresponding to the internal cavity temperature. Another feature of this aspect of the present inventions may be that the processor is adapted to: record an open-valve internal cavity pressure while the valve is in its open position; record a baseline internal cavity pressure at the moment the first and second seal members and the first and second slip member seals move into fully seated engagement with the inner bore of the valve; detect a later internal cavity pressure at some point in time after the first and second seal members and the first and second slip member seals move into fully seated engagement with the inner bore of the valve; determine a difference between the open-valve internal cavity pressure and the later internal cavity pressure; determine a difference between the open-valve internal cavity pressure and the baseline internal cavity pressure; and divide the difference between the open-valve internal cavity pressure and the later internal cavity pressure by the difference between the open-valve internal cavity pressure and the baseline internal cavity pressure and then multiply that amount by 100 to determine a remaining seal life percentage. Another feature of this aspect of the present inventions may be that the processor is adapted to: record a baseline internal cavity pressure after the valve moves into its closed position; detect and record an increase in internal cavity pressure in comparison to the baseline internal cavity pressure; record the start time that the increase in internal cavity pressure was first detected; record a test internal cavity pressure at a test time after the start time; determine and record a time interval between the start time and the test time; determine and record a pressure difference between the baseline internal cavity pressure and the test internal cavity pressure; and determine and record a leak rate by dividing the pressure difference by the time interval. Another feature of this aspect of the present inventions may be that the processor is adapted to assign a leak severity value corresponding to the leak rate. Another feature of this aspect of the present inventions may be that the valve includes a check valve; and the processor is adapted to: determine the rate of change of internal cavity pressure drop from the time the first and second slip member seals make initial contact with the inner bore of the valve to the time the first and second slip members and the first and second slip member seals make fully seated engagement with the inner bore of the valve; use the rate of change of internal cavity pressure drop to determine the extent to which the check valve is leaking when the valve is closing; use the extent of check valve leakage to determine whether the valve is closing at a desired rate; and provide an indication that the check valve is in need of maintenance.

In another aspect, the present inventions may include a method for determining whether at least one slip member seal on a double block and bleed valve is leaking, the valve including an internal cavity, an inner bore, first and second slip members, and first and second slip member seals, comprising: determining a first pressure in the internal cavity when the first and second slip member seals make initial contact with the inner bore; determining a second pressure in the internal cavity when the first and second slip members and the first and second slip member seals move into fully seated engagement with the inner bore; determining whether the second pressure is less than the first pressure; providing an indication of a leak if the second pressure is not less than the first pressure; determining whether the second pressure remains constant if the second pressure is less than the first pressure; providing an indication of a leak if the second pressure does not remain constant; and providing an indication of no leak if the second pressure remains constant. Another feature of this aspect of the present inventions may be that the method further comprises determining a temperature in the internal cavity. Another feature of this aspect of the present inventions may be that the method further comprises: continuously monitoring and recording the internal cavity pressure when the valve is in an open position; detecting and recording the internal cavity pressure and the internal cavity temperature when the first and second slip member seals move into initial contact with the inner bore when the valve plug is moving from its open position to its closed position; detecting and recording the internal cavity pressure and the internal cavity temperature when the first and second slip member seals move into fully seated engagement with the inner bore; determining whether the internal cavity pressure is remaining constant; if the internal cavity pressure is remaining constant, determining whether the internal cavity temperature is changing over time; if the internal cavity temperature is not changing over time, providing an indication that the seals are not leaking; if the internal cavity temperature is changing over time, providing an indication that at least one of the seals is leaking; if the internal cavity pressure is not remaining constant, determining whether the change in internal cavity pressure is due to a change in internal cavity temperature only; if the change in internal cavity pressure is not due to a change in internal cavity temperature only, providing an indication that at least one of the seals is leaking; and if the change in internal cavity pressure is due to a change in internal cavity temperature only, providing an indication that the seals are not leaking. Another feature of this aspect of the present inventions may be that the step of determining whether the change in internal cavity pressure is due to a change in the internal cavity temperature includes: for a given detected internal cavity temperature and corresponding detected internal cavity pressure, determining what the expected internal cavity pressure corresponding to detected internal cavity temperature should be; comparing the detected internal cavity pressure to the expected internal cavity pressure; if the expected internal cavity pressure equals the detected internal cavity pressure, providing an indication that the seals are not leaking; and if the expected internal cavity pressure does not equal the detected internal cavity pressure, providing an indication that the seals are leaking. Another feature of this aspect of the present inventions may be that the step of determining what the expected internal cavity pressure corresponding to detected internal cavity temperature should be includes: accessing from a database at least one fluid property of at least one of a fluid and a fluid mixture flowing through the valve; and using the at least one fluid property to determine the expected internal cavity pressure corresponding to the internal cavity temperature. Another feature of this aspect of the present inventions may be that the method further comprises recording an open-valve internal cavity pressure while the valve is in its open position; recording a baseline internal cavity pressure at the moment the first and second seal members and the first and second slip member seals move into fully seated engagement with the inner bore of the valve; detecting a later internal cavity pressure at some point in time after the first and second seal members and the first and second slip member seals move into fully seated engagement with the inner bore of the valve; determining a difference between the open-valve internal cavity pressure and the later internal cavity pressure; determining a difference between the open-valve internal cavity pressure and the baseline internal cavity pressure; dividing the difference between the open-valve internal cavity pressure and the later internal cavity pressure by the difference between the open-valve internal cavity pressure and the baseline internal cavity pressure and then multiply that amount by 100 to determine a remaining seal life percentage. Another feature of this aspect of the present inventions may be that the method further comprises recording a baseline internal cavity pressure after the valve moves into its closed position; detecting and recording an increase in internal cavity pressure in comparison to the baseline internal cavity pressure; recording the start time that the increase in internal cavity pressure was first detected; recording a test internal cavity pressure at a test time after the start time; determining and recording a time interval between the start time and the test time; determining and recording a pressure difference between the baseline internal cavity pressure and the test internal cavity pressure; and determining and recording a leak rate by dividing the pressure difference by the time interval. Another feature of this aspect of the present inventions may be that the method further comprises assigning a leak severity value corresponding to the leak rate. Another feature of this aspect of the present inventions may be that the method further comprises determining the rate of change of internal cavity pressure drop from the time the first and second slip member seals make initial contact with the inner bore of the valve to the time the first and second slip members and the first and second slip member seals make fully seated engagement with the inner bore of the valve; using the rate of change of internal cavity pressure drop to determine the extent to which a check valve that is part of the valve is leaking when the valve is closing; using the extent of check valve leakage to determine whether the valve is closing at a desired rate; and providing an indication that the check valve is in need of maintenance.

In yet another aspect, the present inventions may include a double block and bleed valve comprising: a main body member, a valve member, and a trunnion; the main body member having a first port, a second port, an internal cavity, and an inner bore; the valve member including a valve plug, a first slip member and a second slip member; the valve plug having a transverse passageway adapted for alignment with the first port and the second port in an open position; the first slip member being secured to a first side of the valve plug and disposed for radial movement relative to the valve plug, the second slip member being secured to a second side of the valve plug and disposed and radial movement relative to the valve plug, the first slip member including a first slip member seal, the second slip member including a second slip member seal; the trunnion being connected to the valve plug, the trunnion being adapted to rotate the valve plug relative to the main body member, move the valve plug up and down relative to the main body member to cause movement of the first slip member and the second member into and out of sealing engagement with the inner bore; and a pressure sensor mounted to the main body member and in communication with the internal cavity. Another feature of this aspect of the present inventions may be that the valve further includes a temperature sensor mounted to the main body and in communication with the internal cavity.

Other features, aspects and advantages of the present inventions will become apparent from the following discussion and detailed description.

BRIEF DESCRIPTION OF THE DRAWINGS

FIG. 5 is a side view partially cut away showing the valve from FIGS. 2-4, and illustrating a slip member being moved toward but not touching an inner bore of the valve, and a seal on the slip member making initial contact with the inner bore.

FIG. 6 is a side view similar to FIG. 5, but now showing the slip member in contact with the inner bore and the seal fully engaged with the inner bore in a sealed and compressed position.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
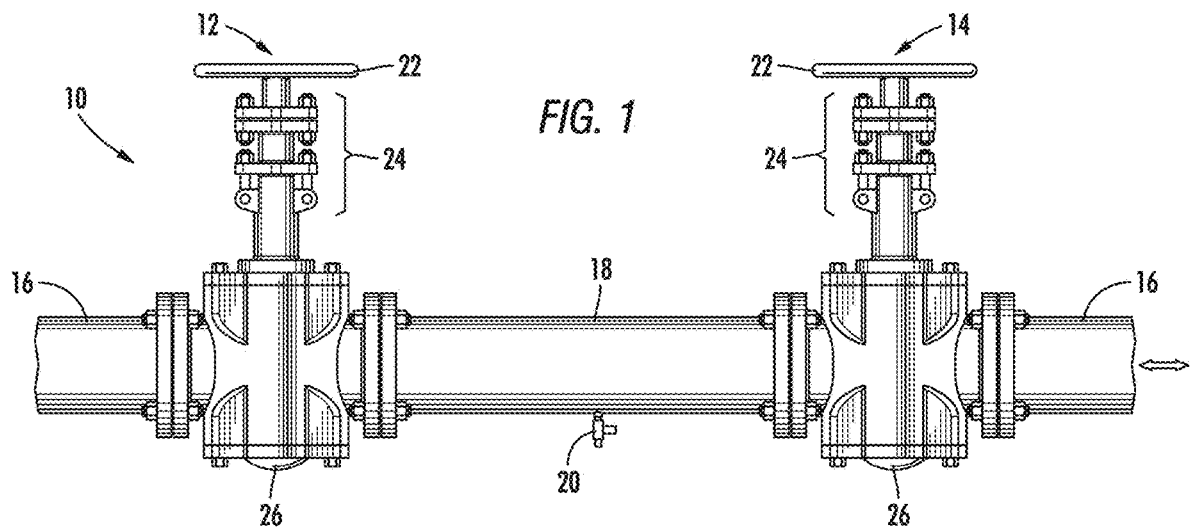
FIG. 1 is a side view showing a prior art double block-and-bleed system.

Referring now to the drawings, and referring initially to FIG. 1, there is shown a side view of a prior art double block-and-bleed valve system 10 including a first valve 12 and a second valve 14 connected to a conduit 16 with a bleed section of conduit 18 disposed between the first and second valves 12 and 14. The bleed section of conduit 18 includes a bleed valve 20. The first and second valves 12 and 14 include a hand wheel 22, an operator section 24, and a valve member section 26. As is well known in the industry, the hand wheel 22 is turned to actuate the operator section 24 to move an internal valve member in the valve section 26 between open and closed positions, to thereby permit and restrict fluid flow through the valve. The function and operation of the double block-and-bleed valve 10 is described above.

As mentioned above, Joseph Heinen developed the double block and bleed expanding plug valve (or Twin Seal valve) as the industry advance over the two valve double block and bleed system described above. The present inventions described hereinbelow represent an advance in the art that builds on the current industry standard double block and bleed expanding plug valve.

Figure 2:
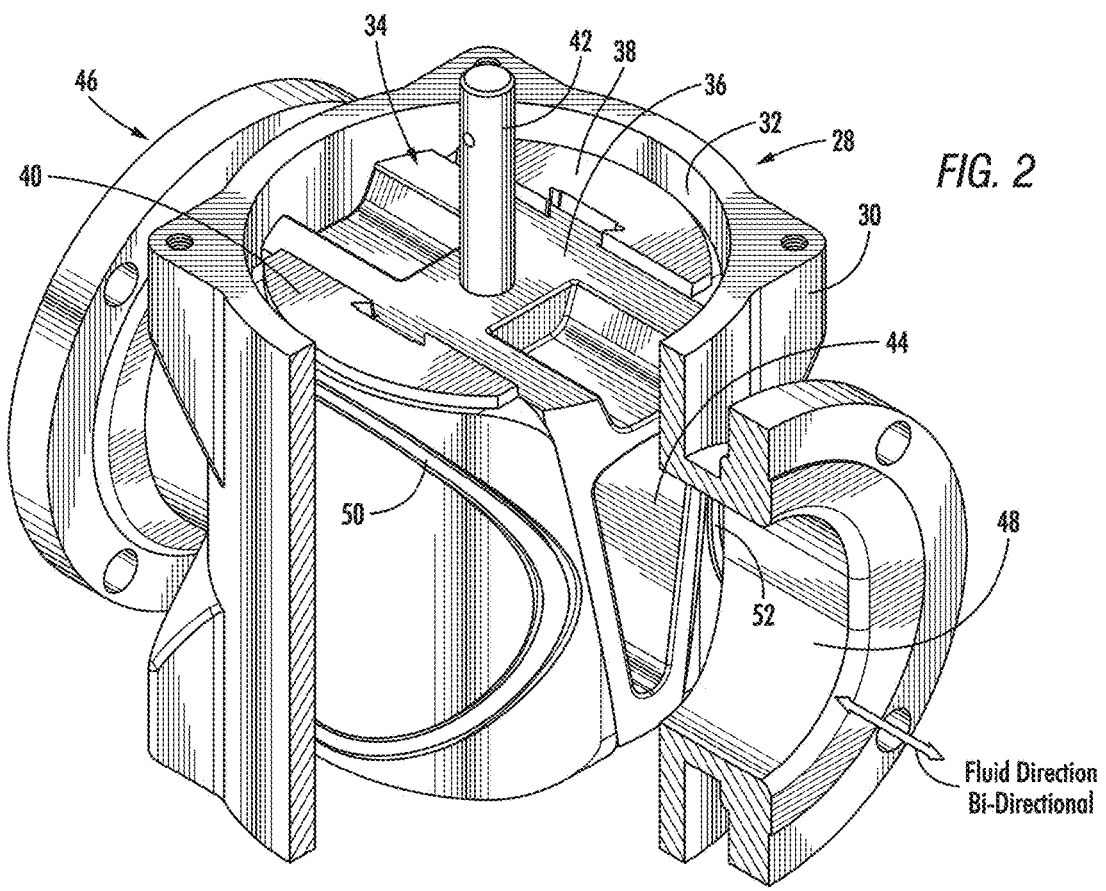
FIG. 2 is a perspective view partially cut away showing a valve in an open position.

Referring now to the remaining drawings in detail, wherein like numerals denote identical elements throughout the several views, and referring to FIG. 2, there is shown a partially cut-away, perspective view of the inside of a valve 28 of a double block and bleed expanding plug valve. The valve 28 generally includes a main body member 30 having an inner bore 32. Disposed within the inner bore 32 is a rotatable valve member 34 that may generally include a valve plug 36, a first slip member 38 secured to a first side of the valve plug 36 and disposed for radial movement relative to the valve plug 36, and a second slip member 40 secured to a second side of the valve plug 36 and disposed for radial movement relative to the valve plug 36. A trunnion 42 is connected to the valve plug 36 and is adapted to rotate the valve plug 36 and move the valve plug 36 up and down relative to the main body member 30, and also to cause horizontal or radial movement of the slip members 38 and 40 into and out of sealing engagement with the inner bore. The trunnion 42 is connected to an operator as known in the art, and is rotated and moved up and down by turning a hand wheel.

It can be seen from FIG. 2 that the valve plug 36 includes a transverse passageway 44. When the valve plug 36 is in its open position as shown in FIG. 2, the transverse passageway 44 is aligned with a first or upstream port 46 in the main body member 30 and a second or downstream port 48 in the main body member 30. The first and second ports 46 and 48 are on opposite sides of the main body member 30. Fluid flow through the valve 28 from the upstream port 46 to the downstream port 48 is permitted when the valve plug 36 is in its open position as shown in FIG. 2. Fluid flow may also be in the reverse direction (i.e., fluid flow may be bidirectional). It can also be seen that the first slip member 38 may include a downstream seal 52, and the second slip member 40 may include an upstream seal 50. The trunnion 42 and the valve plug 36 are in an uppermost position as shown FIG. 2, at which time the slip members 38 and 40 are in retracted positions such that the seals 50 and 52 are not in sealing contact with the inner bore 32.

Figure 3:
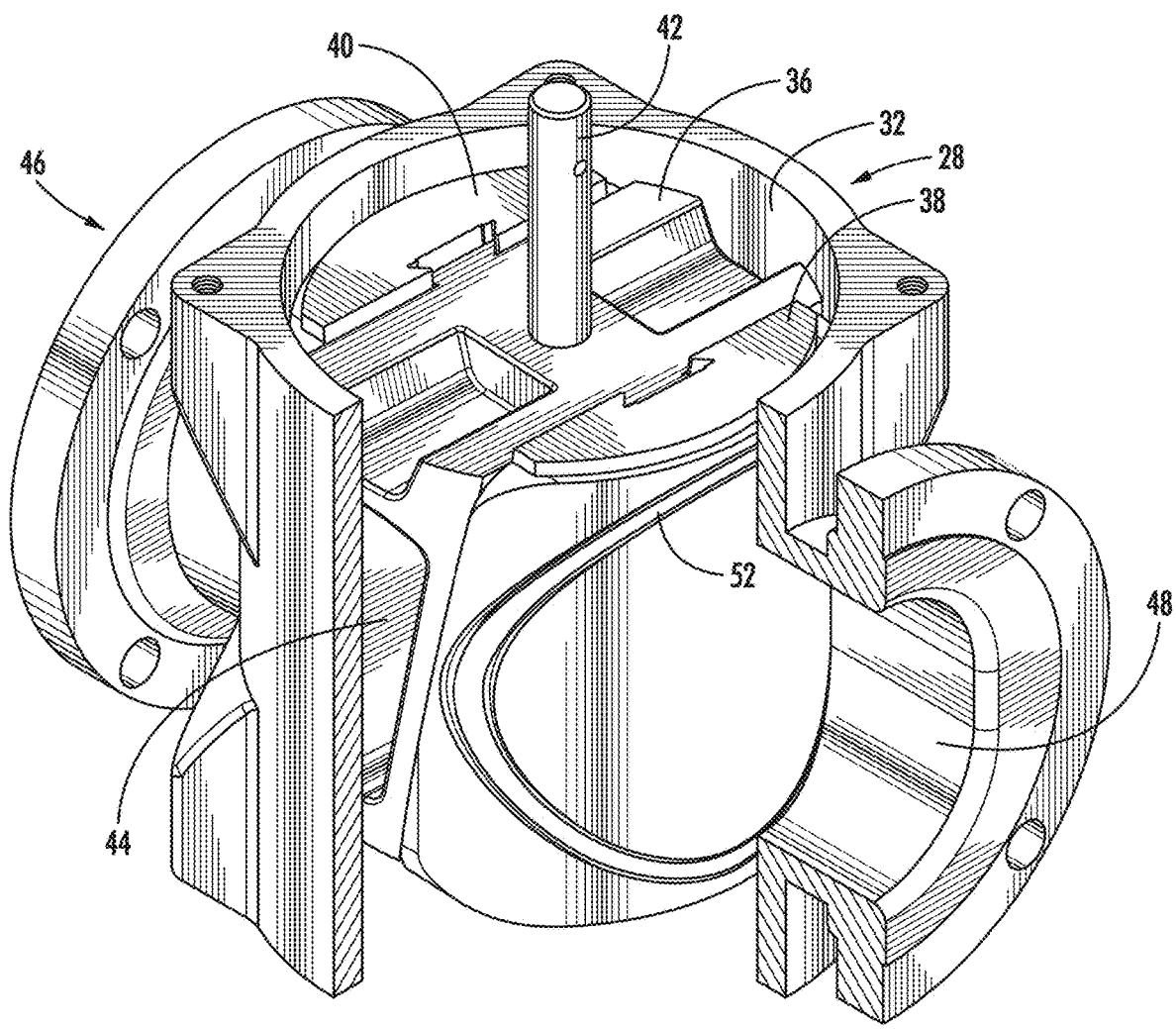
FIG. 3 is a perspective view partially cut away and showing the valve in FIG. 2 now moved into a closed position, but before being moved into a sealing position.

The process of moving the valve plug 36 to its closed position will now be explained. With reference to FIG. 3, the valve plug 36 is shown having been rotated in a clockwise direction viewed from above from its open position to its closed position. The valve plug 36 is shown rotated a quarter turn (i.e., 90 degrees) into a transverse position in which the transverse passageway 44 is generally perpendicular to a longitudinal axis defined through the first and second ports 46 and 48 in the main body member 30. Note that the valve plug 36 and trunnion 42 are still in their upper position in FIG. 3. Also, in the position shown in FIG. 3, the slip members 38 and 40 (along with their corresponding seals 52 and 50) are situated in front of and blocking the first and second ports 46 and 48, but before the slip members 38 and 40, and seals 50 and 52, are moved into sealing relationship with the inner bore 32.

Figure 4:
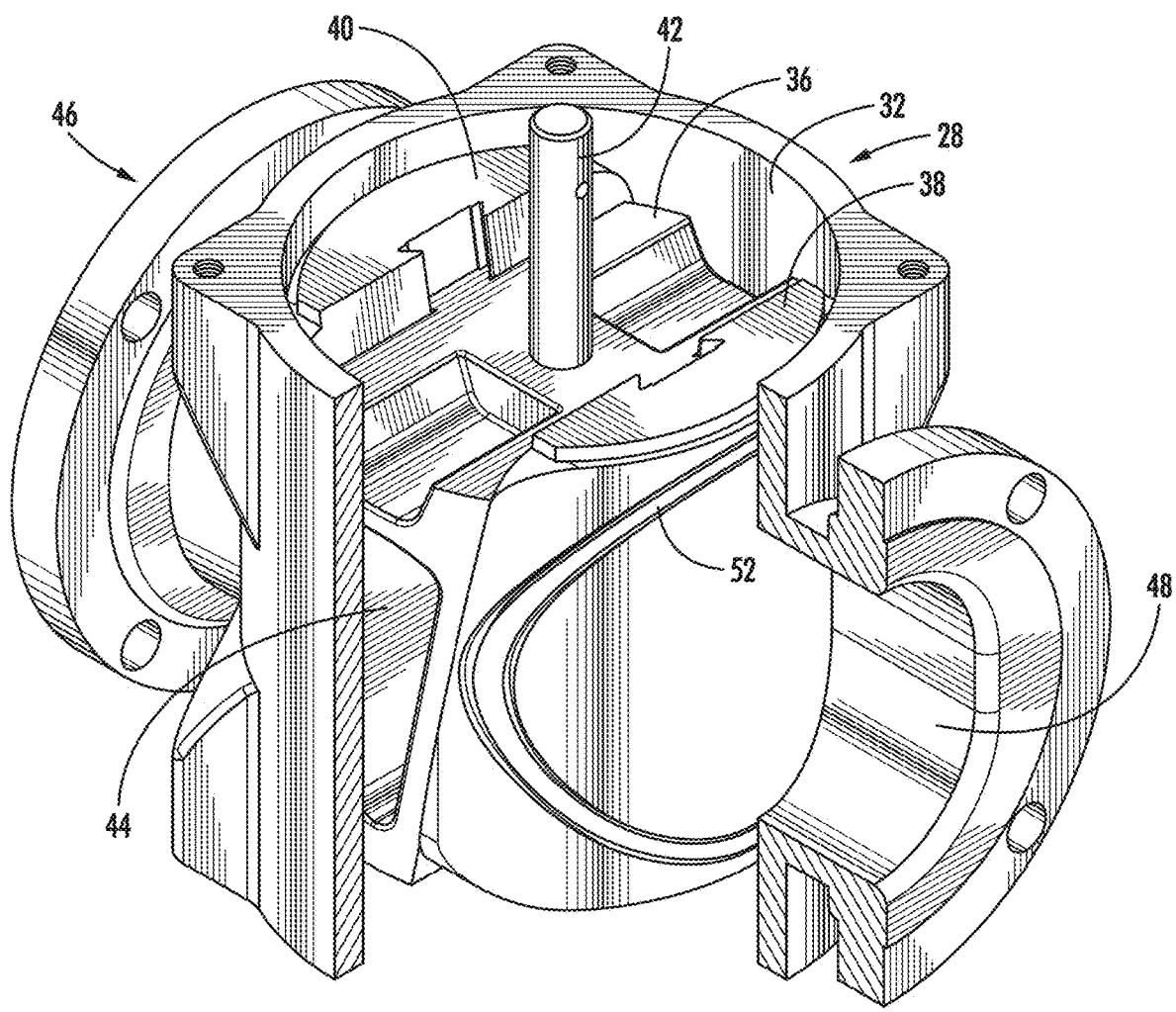
FIG. 4 is a perspective view partially cut away and showing the valve from FIGS. 2-3 in its closed position and after it has been moved into its sealing position.

Referring now to FIG. 4, the valve plug 36 and trunnion 42 have been moved downwardly toward (but not yet reaching) a lowermost or sealing position, which causes the slip members 40 and 38 to move outwardly toward the first and second ports 46 and 48, respectively. This downward movement of the valve plug 36 and trunnion 42 will also eventually force the seals 50 and 52 into sealing relationship with the inner bore 32 and around the first and second ports 46 and 48, respectively. FIG. 5 illustrates a side cross-sectional view showing the downstream seal 52 in initial contact with the inner bore 32. The same thing is simultaneously happening on the other side of the valve plug 36, i.e., the upstream seal 50 is just making initial contact with the inner bore 32. At this point, the first slip member 38 and the second slip member 40 have not yet made contact with the inner bore 32. As mentioned above, and further discussed below, in a specific embodiment, it is at this point of initial contact between the seals 50 and 52 with the inner bore 32 that a first volume $V_1$ is established and a corresponding first internal cavity pressure $P_1$ is measured.

Next, as shown in FIG. 6, the first slip member 38 has now been moved into contact with the inner bore 32, and the downstream seal 52 is now compressed between the inner bore 32 and the first slip member 38 in sealing relationship with the inner bore 32. The second slip member 40 and corresponding upstream seal 50 will likewise move into sealing relationship with the inner bore 32 and around the first or upstream port 46 in the same manner as described above for the first slip member 38 and downstream seal 52 around the second or downstream port 48. As mentioned above, and further discussed below, in a specific embodiment, it is at this point of fully seated contact between the slip members 38 and 40, and corresponding seals 52 and 50, with the inner bore 32 that a second volume $V_2$ is established and a corresponding second internal cavity pressure $P_2$ is measured.

The present inventions are focused in a specific embodiment on monitoring pressure within the main body member 30 before, during, and after the slip members 38 and 40, and their corresponding seals 52 and 50, move into sealing relationship with the inner bore 32. In a specific embodiment, the present inventions further encompass methods and systems for evaluating seal integrity by monitoring internal valve pressure over time. In a specific embodiment, internal valve pressure may be measured by mounting a pressure transducer to the main body member 30 (such as by thread-able attachment to a bore through a side wall of the main body member 30). In a specific embodiment, the pressure transducer is mounted to measure pressure inside a cavity defined by the portion of the valve that is sealed off by the seals 50 and 52. In a specific embodiment, the pressure transducer may be an absolute zero pressure transducer.

Figure 7:
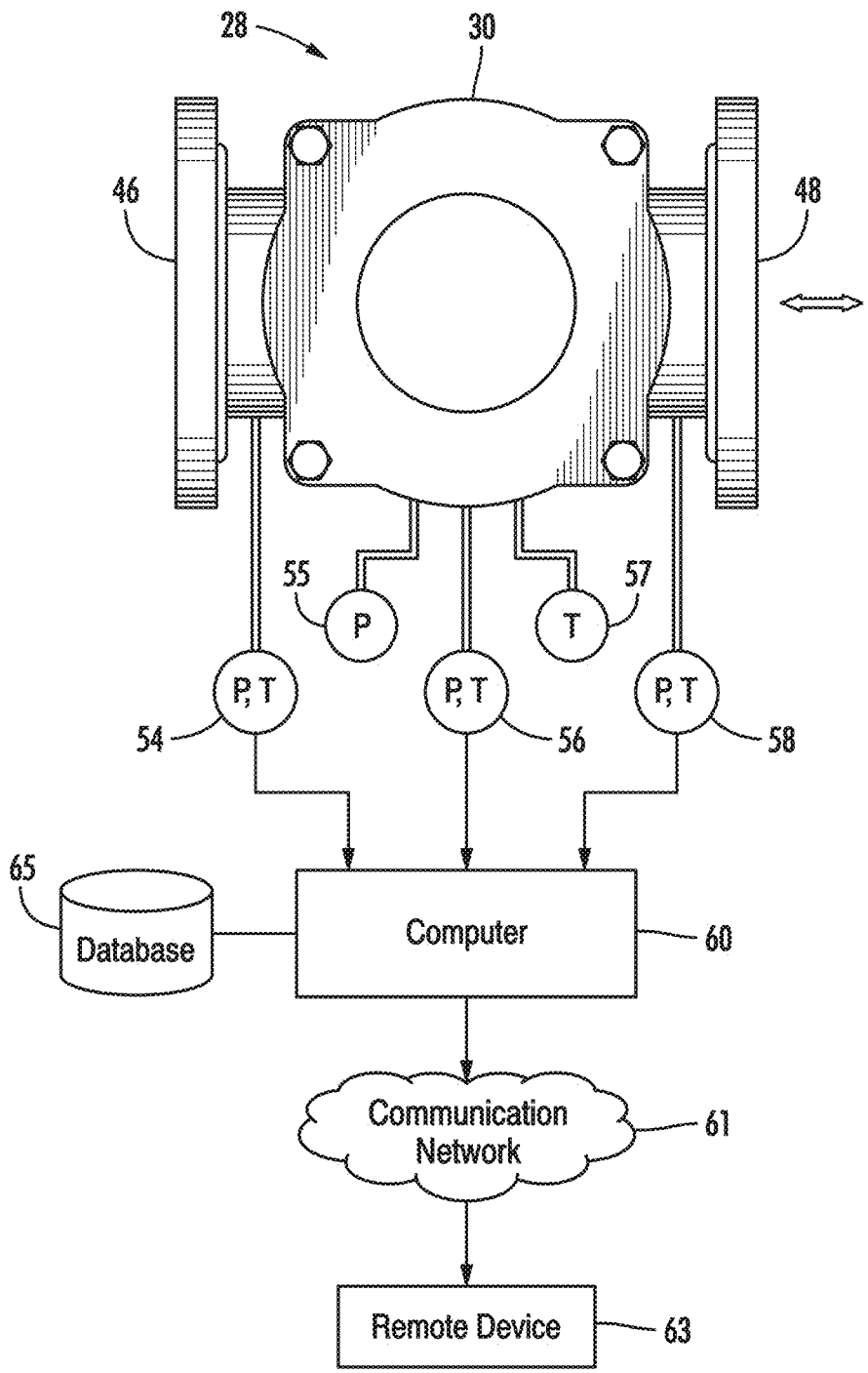
FIG. 7 is a schematic representation of a valve system that may include a valve equipped with one or more pressure and/or temperature sensors in communication with a computer.

Referring now to FIG. 7, in a specific embodiment, the valve 28 may include one or more sensors, including pressure and temperature sensors. In a specific embodiment, the valve 28 may include a first sensor 54 in communication with the first port 46, which may be an inlet, upstream, or high-pressure port. In a specific embodiment, the first sensor 54 may be a pressure sensor. In a specific embodiment, the first sensor 54 may be a temperature sensor. In a specific embodiment, the first sensor 54 may be a combination pressure and temperature sensor. In a specific embodiment, the first sensor 54 may be connected to a computer 60. The computer 60 may be in communication via a communication network 61 with a remote device 63 (e.g., a computer, smartphone, tablet, etc.) so as to provide information including leak data regarding the valve 28 to a remote location. In a specific embodiment, the leak data may be provided on a display on the computer 60 or any computer, which may be located adjacent the valve 28. In another specific embodiment, the leak data may be provided to a database. Details of the computer 60 are discussed below in connection with FIG. 10.

Still referring to FIG. 7, in a specific embodiment, the valve 28 may include a second sensor 56 in communication with the interior cavity of the main body member 30 that is sealed off by the seals 50 and 52. In a specific embodiment, the second sensor 56 may be a pressure sensor. In a specific embodiment, the valve 28 may include a pressure sensor 55 in communication with the interior cavity of the main body member 30 to sense the pressure in the interior cavity. In a specific embodiment, the second sensor 56 may be a temperature sensor. In a specific embodiment, the valve 28 may include a temperature sensor 57, such as a thermocouple, in communication with the interior cavity of the main body member 30 to sense the temperature in the interior cavity. In a specific embodiment, the second sensor 56 may be a combination pressure and temperature sensor. In a specific embodiment, the second sensor 56, the pressure sensor 55, and/or the temperature sensor 57 may be connected to the computer 60.

Still referring to FIG. 7, in a specific embodiment, the valve 28 may include a third sensor 58 in communication with the second port 48, which may be an outlet, downstream, or low-pressure port. In a specific embodiment, the third sensor 58 may be a pressure sensor. In a specific embodiment, the third sensor 58 may be a temperature sensor. In a specific embodiment, the third sensor 58 may be a combination pressure and temperature sensor. In a specific embodiment, the third sensor 58 may be connected to the computer 60. It is noted with respect to FIG. 7 that the flow direction as indicated by the arrows is from left to right, but that should not be taken as a limitation, as fluid flow may also be from right to left.

In a specific embodiment, the computer 60 may be provided with software to monitor signals from one or more of the sensors 54-58, and provide an indication of seal integrity of the upstream and downstream seals 50 and 52. A specific embodiment of a process according to the present inventions is illustrated in FIG. 8.

Figure 8:
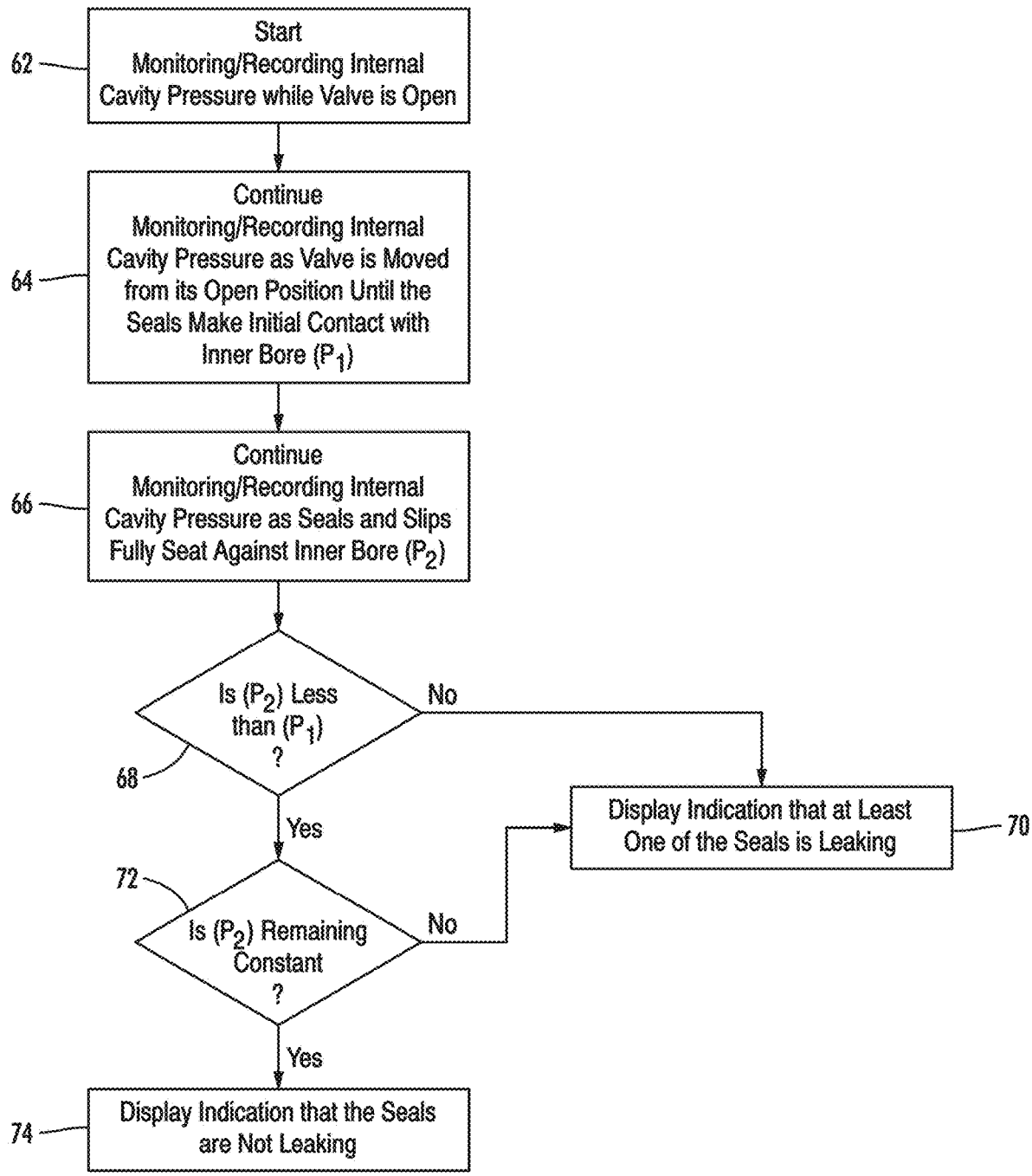
FIG. 8 is a flow chart depicting a specific embodiment of a process according to the present inventions for determining whether a valve is leaking.

With reference to FIG. 8, the process may begin at step 62 by starting to monitor and record the internal cavity pressure while the valve 28 is in its open position, such as shown in FIG. 2. Next, at step 64, the process continues to monitor and record the internal cavity pressure as the valve 28 is moved from its open position towards its closed/sealed position and the seals 50 and 52 make initial contact with the inner bore 32 (see, e.g., FIG. 5 showing seal 52 contacting the inner bore 32). A first volume $V_1$ is defined at this point as the seals 50 and 52 trap a volume of fluid when the seals 50 and 52 make initial contact with the inner bore 32. Also, a first pressure $P_1$ of the internal cavity defined by the seals 50 and 52 is measured at this point, such as by sensor 55 or sensor 56 shown in FIG. 7. The first pressure $P_1$ is illustrated on the graph shown in FIG. 9. As the slip members 38 and 40 continue to move outwardly to compress the seals 52 and 50 against the inner bore 32, the volume will gradually expand and correspondingly the internal cavity pressure will gradually drop, assuming the seals are functioning properly.

Figure 9:
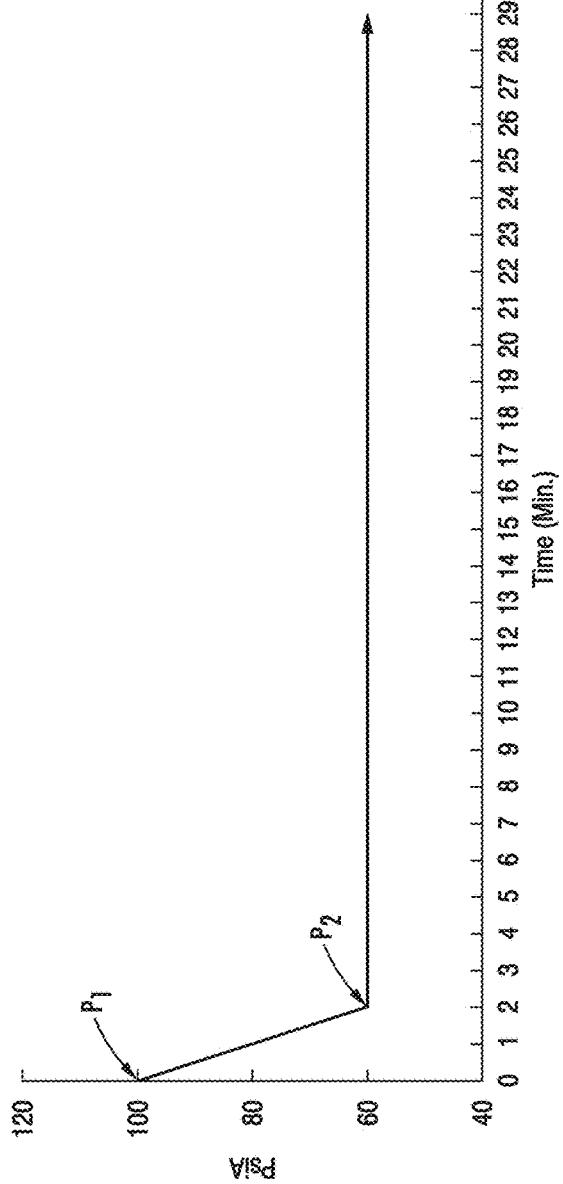
FIG. 9 is a graph illustrating a first pressure P1 before a valve plug is closed and a second pressure P2 after a valve plug is fully seated.

Next, at step 66, the process continues to monitor and record the internal cavity pressure after the slip members 38 and 40, and corresponding seals 52 and 50, are moved into a fully seated position against the inner bore 32, such as shown in FIG. 6. A second volume $V_2$ is defined at this fully seated position. The first volume $V_1$ is smaller than the second volume $V_2$. Also, a second pressure $P_2$ of the internal cavity is measured at this point. The second pressure $P_2$ is illustrated on the graph shown in FIG. 9. It is noted that the scales for pressure and time as shown in FIG. 9 are examples only. In addition, the units for time are also examples, and could be represented in any units of time, such as minutes and seconds, for example. The same holds true for the scale and units for FIGS. 10-15 discussed below, including with respect to temperature, which is included on some of those Figures. Next, at step 68, the process determines whether $P_2$ is less than $P_1$. If the answer at step 68 is "No," then the process proceeds to step 70 to display or provide an indication that at least one of the seals is leaking. If the answer at step 68 is "Yes," then the process proceeds to step 72, where the process determines whether $P_2$ is remaining constant. If the answer at step 72 is "No," then the process proceeds to step 70 to display or provide an indication that at least one of the seals is leaking. If the answer at step 72 is "Yes," then the process proceeds to step 74 to display or provide an indication that the seals are not leaking. As mentioned elsewhere herein, indications that the seals are or are not leaking, or any other data gathered as discussed herein (e.g., seal life, leak severity, check valve integrity, etc.), may be provided to a database or any other computer whether for storage and/or display.

Figure 10:
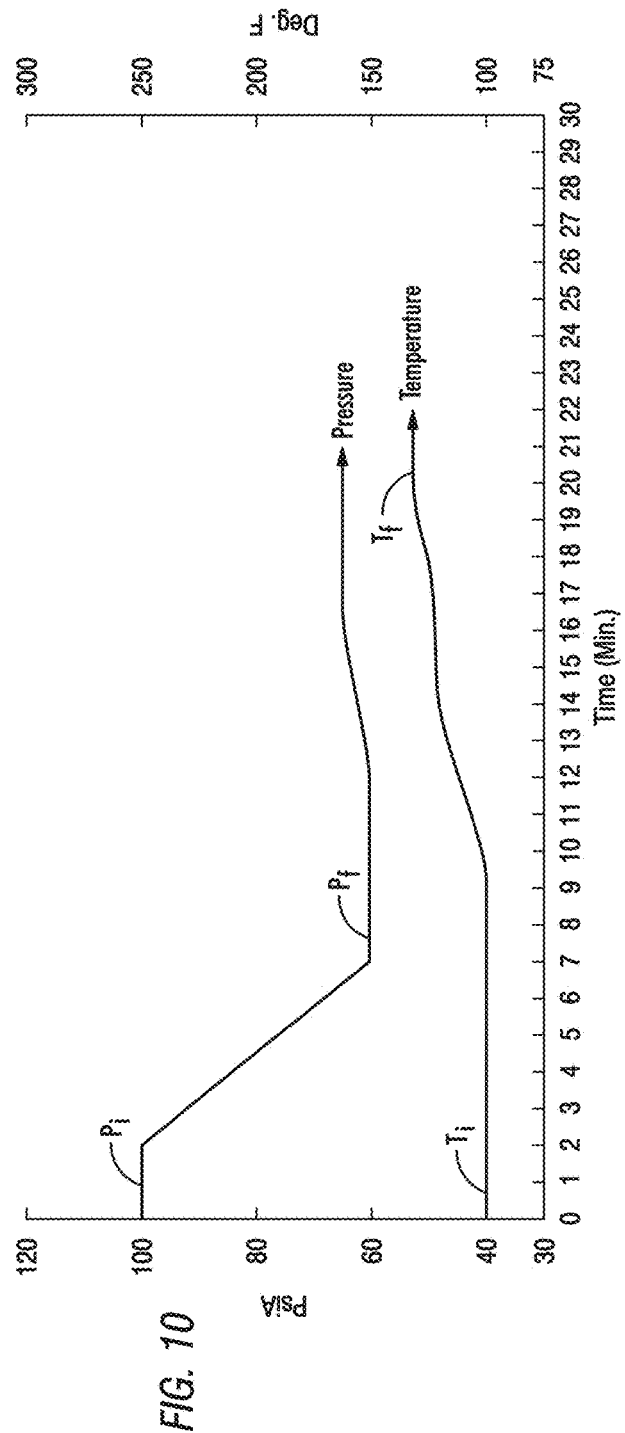
FIG. 10 is a graph illustrating a valve leak test showing changes in pressure and temperature versus time, which may be useful for determining if a pressure change is based on a seal leak or a temperature change.

Referring now to FIG. 10, a graph is provided illustrating a valve leak test showing changes in pressure and temperature versus time. For any given fluid that may be flowing through a valve, there will be a known relationship between temperature and pressure for the given fluid or fluid mixture. This relationship may be defined by fluid properties of the fluid or fluid mixture, including but not limited to the coefficient of thermal expansion and bulk modulus for the given fluid or fluid mixture. A database 65 connected to the computer 60 (or that may be part of the computer memory 308) may include various fluid properties for each fluid that may be flowing through the valve 28, including but not limited to the coefficient of thermal expansion and bulk modulus for each such fluid. The relationship between temperature and pressure can be used to determine whether the pressure change is or is not expected based on the change in temperature. In a specific embodiment, a leak analysis and reporting system such as shown in FIG. 7 may be configured to determine if a pressure change is due to a seal leak or a temperature change. In such a system, an operator would input the details for the fluid or fluid mixture flowing through the valve 28, including whether it is to be treated as a single fluid or a mixture of two or more fluids. For fluid mixtures, the operator would input (such as through computer input/output interface 322) the percentage of each fluid in the fluid mixture, and the system would calculate composite properties for the fluid mixture. The system may be programmed, based on fluid properties in the database 65, to determine the expected pressure change for a given temperature change, whether for a single fluid or a mixture of two or more fluids.

Figure 11:
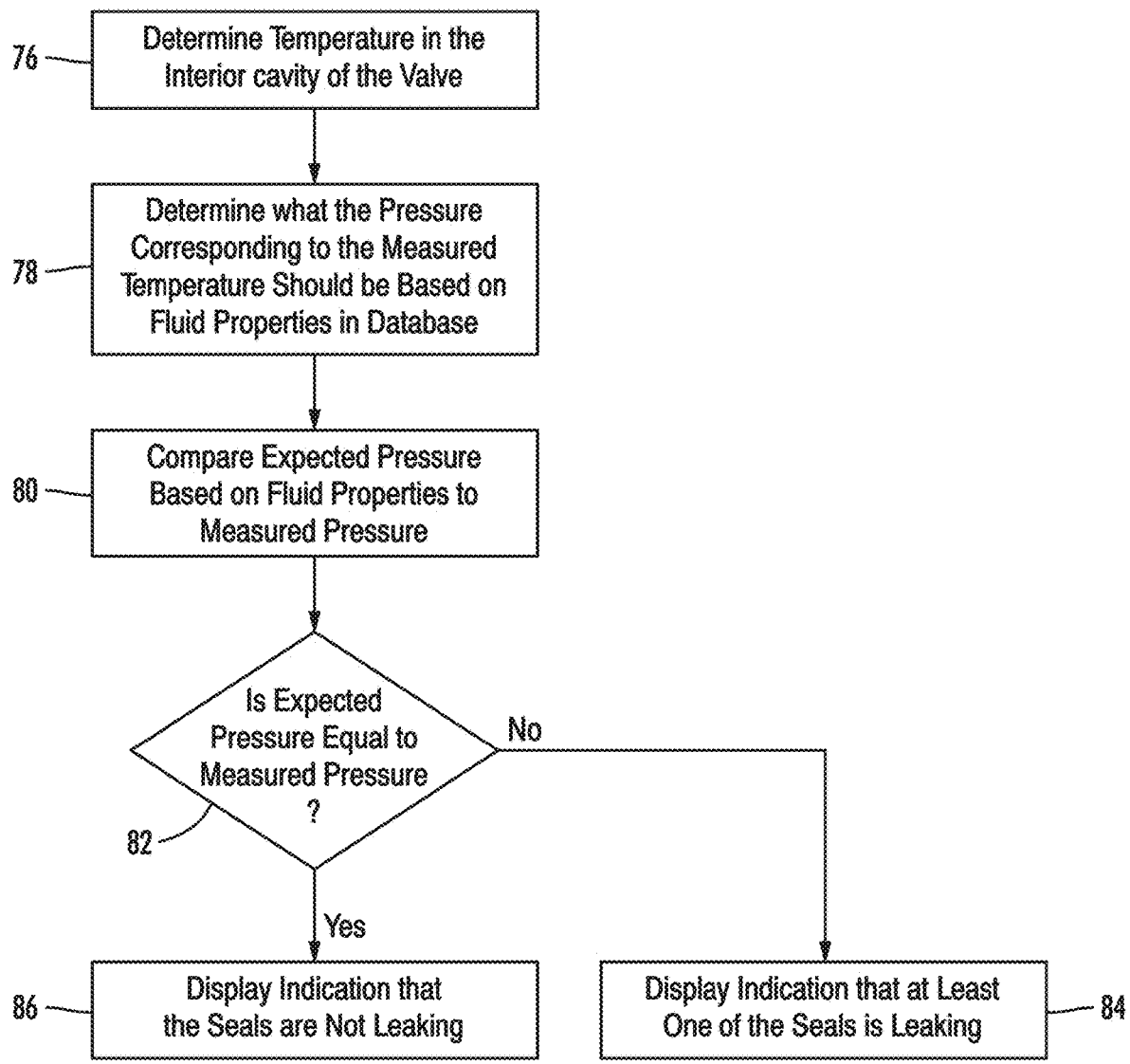
FIG. 11 is a flow chart depicting a specific embodiment of a process according to the present inventions for determining whether a valve is leaking by comparing an actual measured pressure and an expected pressure corresponding to a measured temperature.

A specific embodiment of a process for using the temperature to determine whether the seals are leaking is shown in FIG. 11. In a specific embodiment, this process may be used if the system has determined that the final pressure (i.e., $P_2$ or $P_f$) is changing, such as if the answer to step 72 in FIG. 8 is "no." Referring now to FIG. 11, at step 76, the process may first determine the temperature in the interior of the valve 28, such as by use of the temperature sensor 57 shown in FIG. 7. Next, at step 78, the process may determine the expected pressure corresponding to the measured temperature based on the fluid properties in the database 61. Next, at step 80, the process may compare the expected pressure to the actual measured pressure. Next, at step 82, the process may determine whether the expected pressure equals the actual measured pressure. If the answer at step 82 is "no," then the system knows that the change in pressure is not being caused by the change in temperature, and the process proceeds to step 84, so the process can display or provide an indication that at least one of the seals is leaking, such as on the display 324 of the computer 60 (see FIG. 16) or for storage on a database such as database 65 shown in FIG. 7, for example. If the answer at step 82 is "yes," then the system knows that the measured pressure corresponds to the temperature, and the process proceeds to step 86, so the process can display or provide an indication that the seals are not leaking. It is noted that the process of FIG. 11 may be performed continuously according to a selected sample rate, which may be many times per second, for example. The system may continuously record the pressures and corresponding temperatures. The system may also continuously monitor pressure and temperature differentials, including differences between the beginning pressure at valve closure and each successive measured pressure within the interior cavity of the valve. The system may provide alerts and/or information via the computer display 324 or otherwise, such as by email or text message, for example, including based on the measured temperatures and/or pressures, and/or differentials between temperature and/or pressure.

Figure 12:
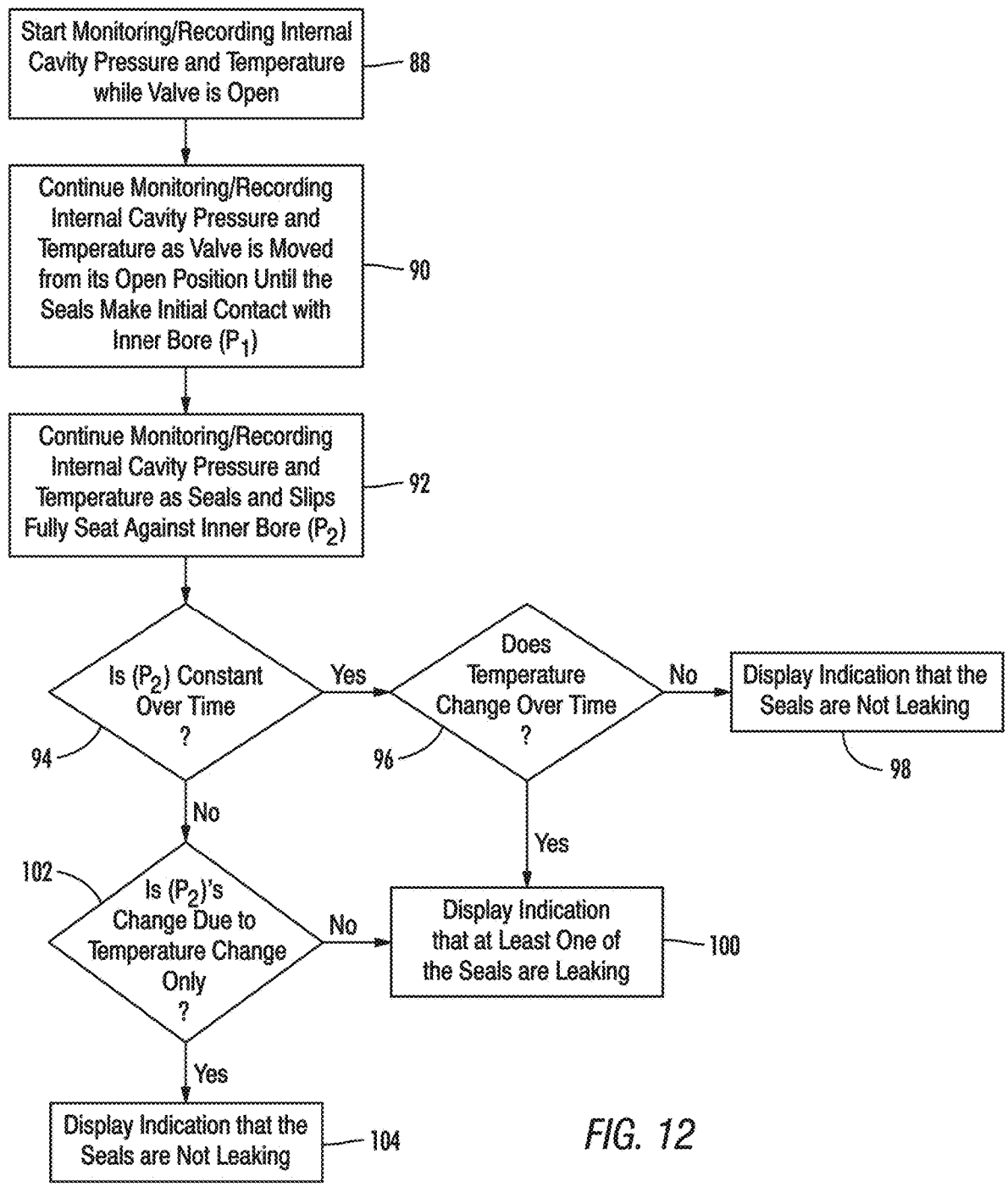
FIG. 12 is a flow chart depicting a specific embodiment of a process according to the present inventions for determining whether a valve is leaking by monitoring and analyzing pressure and temperature within an interior cavity of a valve.

A specific embodiment of a process for monitoring and analyzing pressure and temperature within the interior cavity of the valve to determine whether the seals are leaking is shown in FIG. 12. At step 88, the process may start monitoring and recording the internal cavity pressure and internal cavity temperature while the valve 28 is open. Next, at step 90, the process may continue monitoring and recording internal cavity pressure and temperature as the valve 28 is moved from its open position until the seals make initial contact with the inner bore of the valve. As discussed elsewhere herein, the pressure detected at the point in time that the seals make initial contact with the inner bore is referred to as the initial pressure, and referred to herein as $P_1$ or $P_i$. Next, at step 92, the process continues monitoring and recording the internal cavity pressure and temperature as the seals and slips fully seat against the inner bore. As discussed elsewhere herein, this pressure is referred to herein as final pressure, and referred to herein as $P_2$ or $P_f$. Next, at step 94, the process is continuously monitoring and recording the pressure when the valve is closed (i.e., $P_2$ or $P_f$) to see if the internal cavity pressure is remaining constant. If the answer at step 94 is "yes" (i.e., the pressure is not changing), then the process proceeds to step 96 to determine whether the temperature is changing over time. If the answer at step 96 is "no," then the process proceeds to step 98 and displays or provides an indication that the seals are not leaking, such as on the computer display 324 or to the database 65, for example. If the answer at step 96 is "yes," then the process proceeds to step 100 and displays or provides an indication that at least one of the seals is leaking. Going back to step 94, if the answer there is "no" (i.e., the pressure is changing), then the process proceeds to step 102 to determine whether the change in pressure is due to a change in temperature only. The process disclosed in FIG. 11 may be employed to implement step 102. If the answer at step 102 is "no," then the process proceeds to step 100, which, as explained above, displays or provides an indication that at least one of the seals is leaking. If the answer at step 102 is "yes," then the process proceeds to step 104 to display or provide an indication that the seals are not leaking. Again, as mentioned above, in a specific embodiment, the system is continuously monitoring and analyzing the internal cavity pressure and temperature (including pressure and temperature differentials), such as according to the process set forth in FIG. 12.

Figure 13:
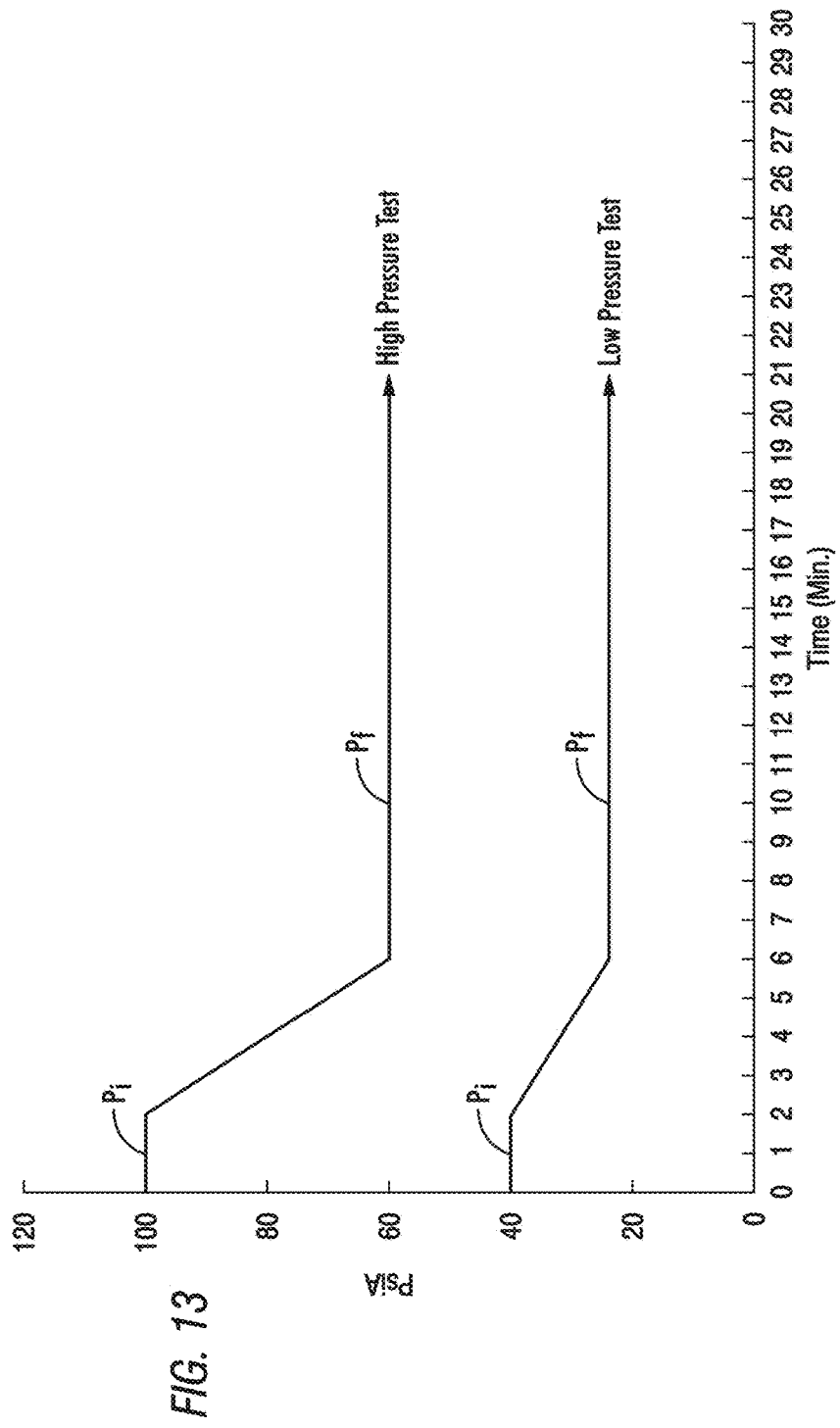
FIG. 13 is a graph illustrating a valve leak test showing changes in pressure versus time.
Figure 13A:
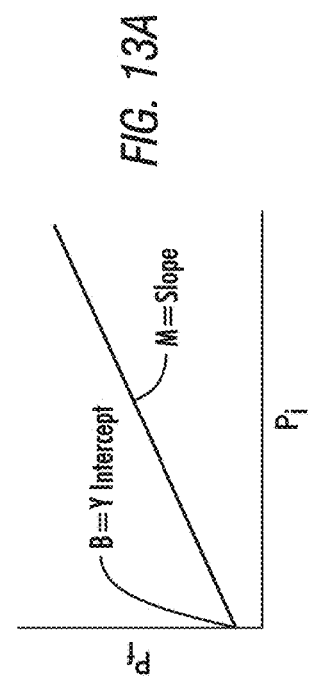
FIG. 13A is a graph illustrating a valve and seal characteristic curve.

Referring now to FIG. 13, a graph is shown illustrating a valve leak test showing changes in pressure versus time. In this graph, the system performs a high-pressure test, which is the upper plotted line, and a low-pressure test, which is the lower plotted line. The high pressure and low-pressure tests are performed at separate times. This may be done on a test apparatus, or in connection with an actual in the field installation by storing pressure measurements for relatively high versus relatively low fluid actual fluid pressures being passed through the valve 28. This allows the system to create the graph shown in FIG. 13A, which is a graph illustrating a valve and seal characteristic curve. It plots $P_2$ or $P_f$ on the y-axis, and $P_1$ or $P_i$ on the x-axis. The data from the high-pressure graph and the low-pressure graph provides two points on the line shown in FIG. 12A. The line shown in FIG. 13A is defined by the formula $P_f = m \times P_i + B$, where M and B are different for each valve size, seal type and fluid. M is influenced by different fluids. Generally, more compressible fluids will have a higher slope than less compressible fluids. So, the graph shown in FIG. 13A will be for a given valve, a given seal type, and a given fluid. In a specific embodiment, water may be used as the fluid to provide a baseline. The characteristic curve may be stored and compared to other know characteristic curves for other known valve models and brands, and can be used to determine what valve is being monitored and/or what type of seal is in the valve being monitored.

Figure 14:
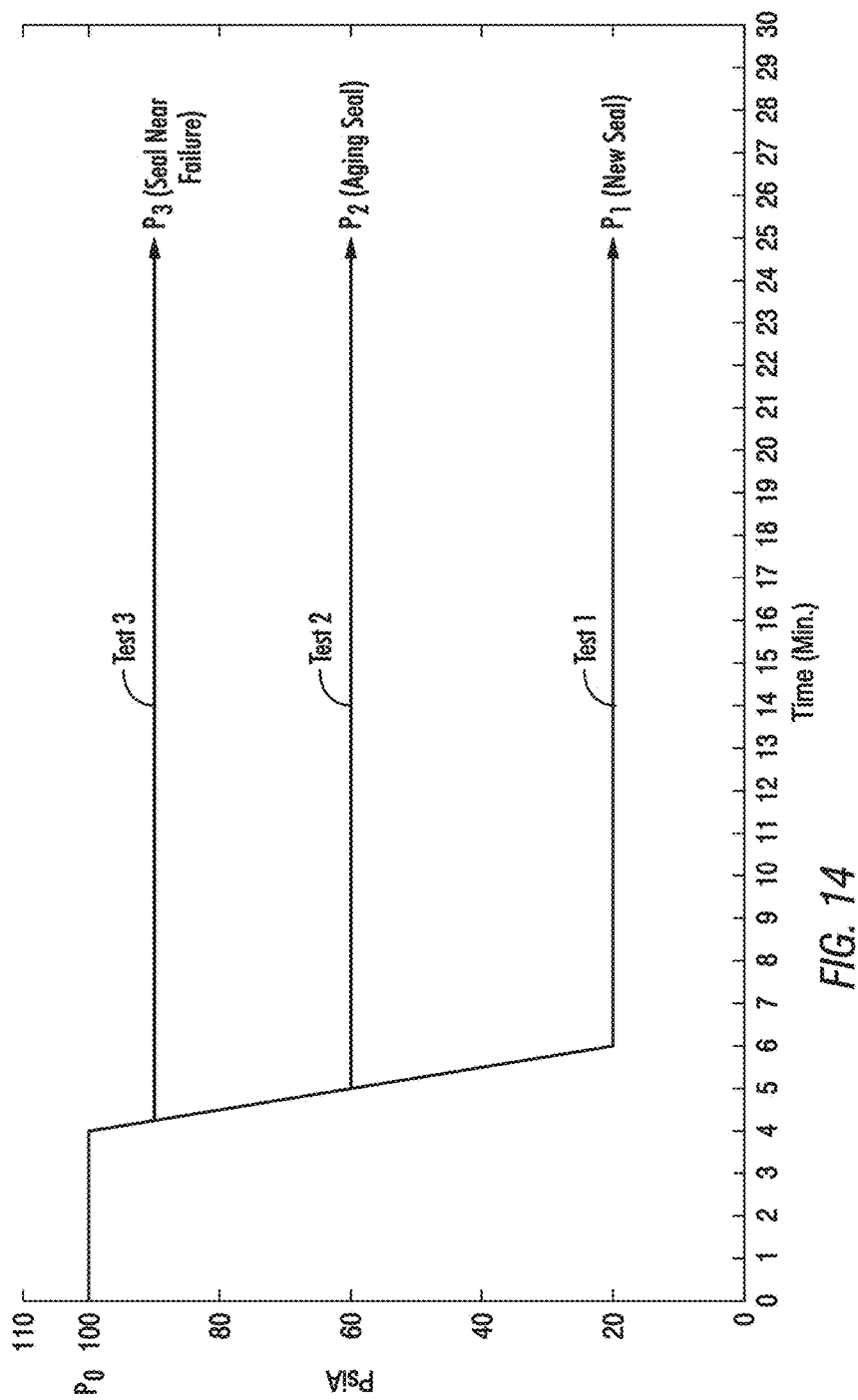
FIG. 14 is a graph illustrating three valve leaks tests showing changes in pressure versus time, including a first test corresponding to a new seal, a second test corresponding to an aging seal, and a third test corresponding to a seal near failure.
Figure 14A:
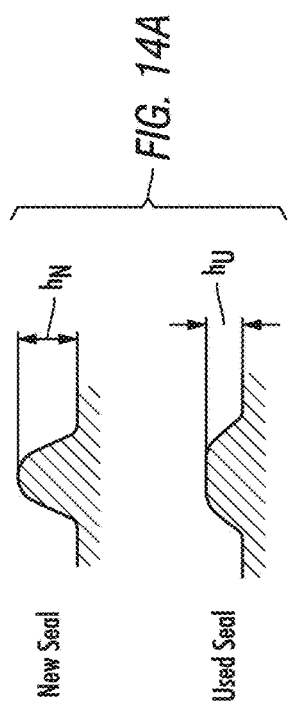
FIG. 14A shows the seal height for a new seal and the seal height for a used seal.

Referring now to FIG. 14, a graph is shown illustrating changes in pressure versus time for three pressure tests. On the vertical axis the initial pressure is 100 psiA. The first test shows the final pressure after the valve is closed for a new seal, at 20 psiA. The second test shows the final pressure for an aging seal, at 60 psiA. The third test shows the final pressure for a seal near failure, at 90 psi A. The seal height for a new seal (corresponding to Test 1) is shown in FIG. 14A, and the seal height for a used or aging seal (such as corresponding to Test 2) is also shown in FIG. 14A. As the valve cycles over time, the seal height will gradually decrease. As the seal height gradually decreases, the final pressure will gradually rise and move closer to the initial pressure.

Figure 15:
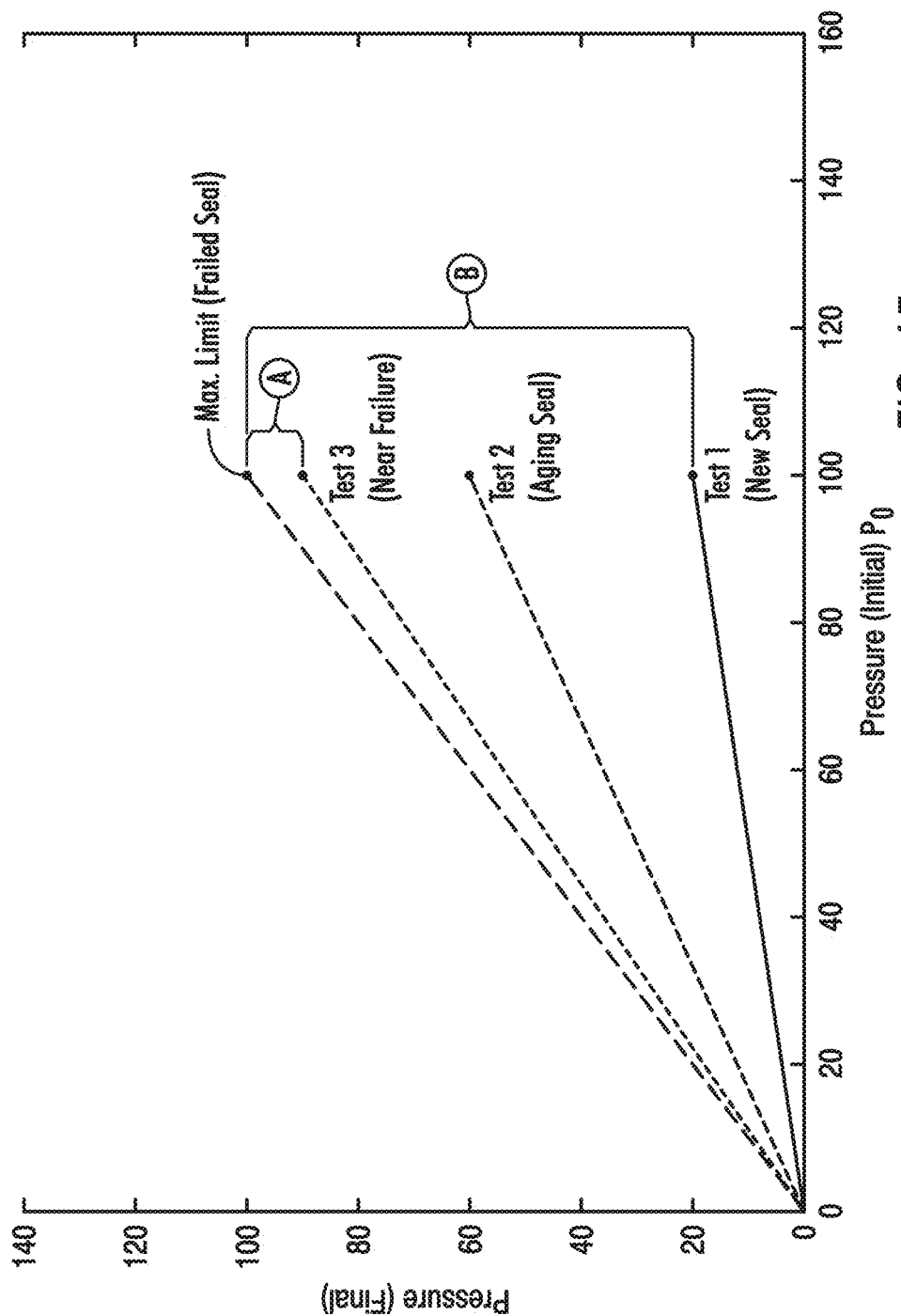
FIG. 15 is a graph illustrating the same three leak tests as shown in FIG. 13, but here the graph shows final pressure versus initial pressure, and also add a line showing the maximum limit of the seals or the point at which the seals fail.

FIG. 15 graphs the data corresponding to the three different tests. In FIG. 15, the final pressure on the y-axis is displayed versus initial pressure on the x-axis. It can be seen the slopes of the lines corresponding to Tests 1, 2 and 3 gradually increases. So as the seal height decreases, the slopes of the lines for the three tests increases. FIG. 15 also includes a line corresponding to the maximum limit or seal failure, which occurs at the initial pressure. The data from FIG. 15 can be used to determine remaining seal life as a percentage. The difference between the maximum limit and the test being evaluated (in FIG. 15 it is Test 3) is indicated by the letter A. The difference between the final pressure for Test 1 (i.e., the final pressure for a new seal) is indicated by the letter B. The ratio of A to B is the remaining seal life percentage. In the example shown in FIG. 15, A=100−90=10, and B=100−20=80. So, 10 divided by 80×100=12.5%. This is the remaining seal life percentage when Test 3 is performed. In a specific embodiment, the system such as shown in FIG. 7 may display the remaining seal life percentage on the computer display 324, and/or provide the seal life percentage to the database 65 and/or to a remote location, such as via email or text message, for example.

Figure 16:
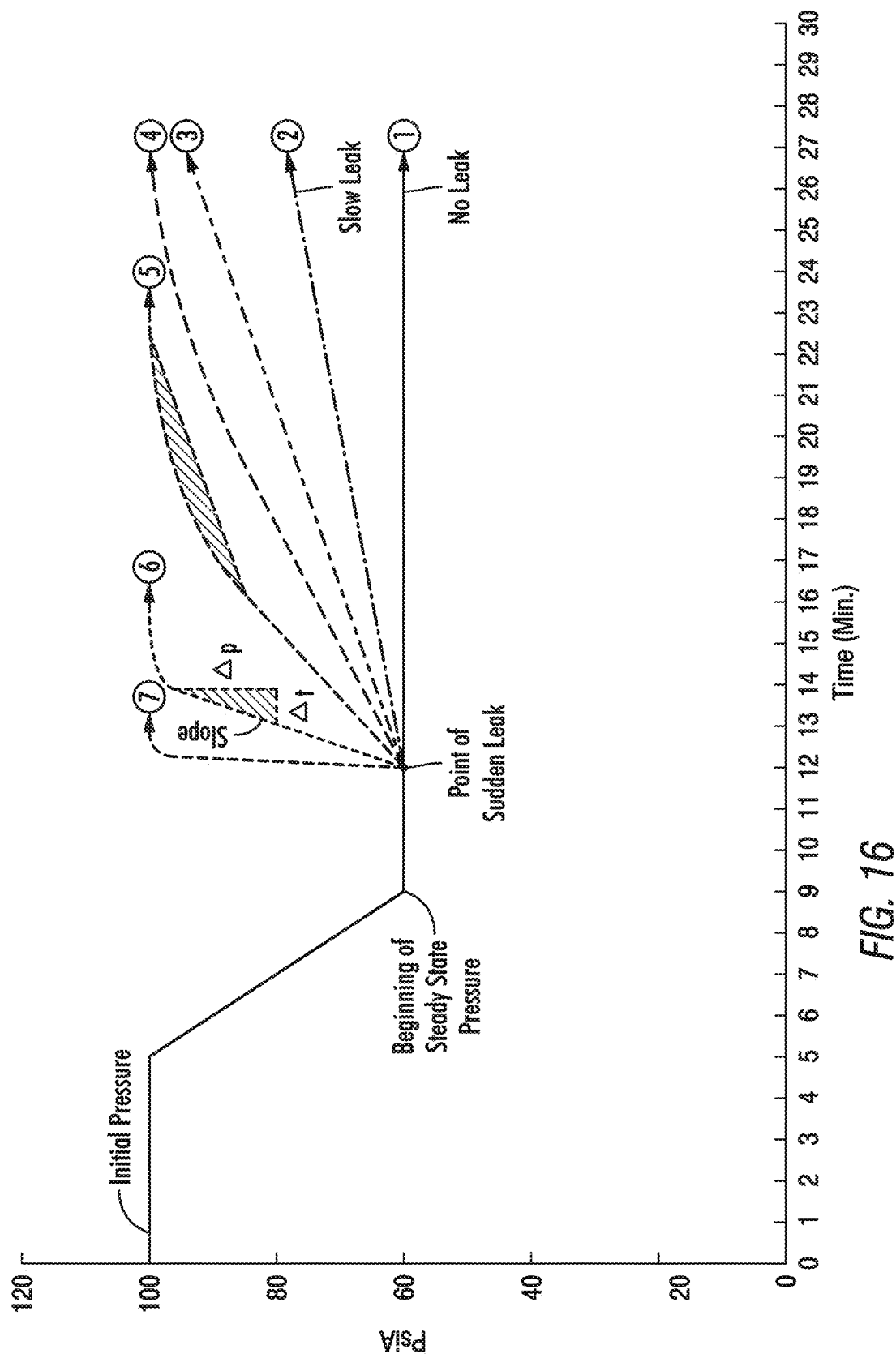
FIG. 16 is a graph illustrating the severity of a leak based on the slope of the leak.

Referring now to FIG. 16, a graph is provided for a valve leak test showing changes in pressure versus time. This graph illustrates how the system can determine the severity of a leak based on the slope of the leak. The solid line (Curve 1) represents what the test looks like without any leaks (i.e., M=0). The dashed lines (Curves 2-7) are progressively faster leaks because the change in pressure in each case occurs over less time. The first derivative is M=dP/dt, which is the slope of the line, as depicted for example on Curve 6. The higher the slope, the more severe the leak. The second derivate is dM/dt, which is the rate at which the slope is changing, as depicted for example in the shaded area under Curve 5. The second derivative relates to the radius of curvature of the curve such that a high 2nd derivative is the result of a small radius (see Curve 7), and a lower 2nd derivative is the result of a large radius of curvature (see Curve 5). The ability of the system to determine the severity of a leak is important from a safety perspective. Curves 1-4 would be considered lower magnitude leaks. However, Curves 5-7 would be considered higher magnitude leaks that would require immediate investigation.

In a specific embodiment, the system such as in FIG. 7 may be programmed to determine and assign a leak severity rating based on the data being observed, and may display or provide the leak severity rating on the computer display 324, to the database 65, and/or to the remote device 63, such as by email or text message, for example. In a specific embodiment, in addition to determining if a valve is leaking or not, the systems and methods of the present inventions may qualitatively measure and report the magnitude of a leak in terms of the time-rate of change of pressure (psi/sec). The leak rate may be achieved by measuring pressure over time and calculating the change in pressure (delta-P) divided by the change in time (delta-T) after a leak starts. This slope is a rate (psi/sec) where any similar units apply. The magnitude of the leak rate is considered high when the slope is high, and the magnitude of the leak rate is considered low when the slope is low. In a specific embodiment, the system may assign a leak severity value based on the magnitude of leak rate, and provide: that information to an end user via the computer display 324, to the database 65, and/or to a remote device 63, such as by email or text message, for example.

Figure 17:
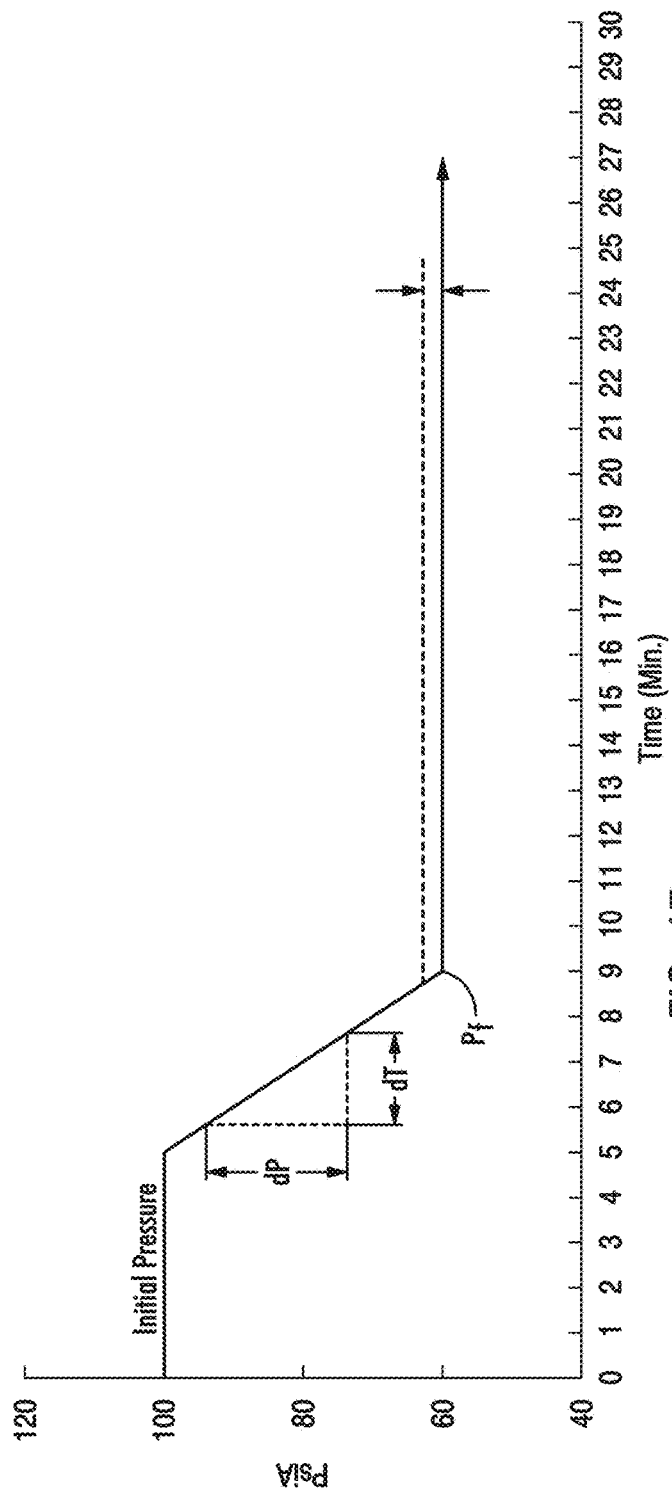
FIG. 17 is a graph illustrating a valve leak test showing changes in pressure versus time, which may be useful in determining if a valve is closing at an optimal rate.
Figure 17A:
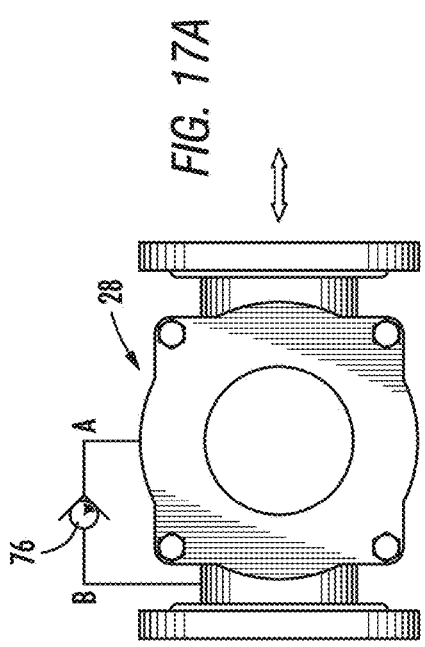
FIG. 17A illustrates a check valve that may be part of a valve in accordance with the present inventions.

FIG. 17 is a graph illustrating a valve leak test showing changes in pressure versus time, which may be useful in determining if a valve is closing at an optimal rate. This can be determined by using the calculated slope of the pressure drop during valve closing. This is done by indirectly monitoring a check valve 76 on a valve 28, as shown in FIG. 17A. This is done indirectly by monitoring the pressure in the interior cavity of the valve 28. The check valve 76 is connected between the center cavity A of the valve 28 and the high-pressure inlet B of the valve 28, which is the direction of allowable flow or recommended bleed. The check valve 76 does not permit flow from B to A, but does leak slightly during valve closure. Monitoring the slope of the pressure drop can be done to determine if the valve is closing at an optimal speed to minimize leaking of the check valve 76, and to ensure that is seals as quickly as possible. The slope of the pressure drop is related to how fast the valve is closed. The system can determine the rate of change of pressure drop while the seal is being compressed.

When the pressure drops in the center cavity A during valve closure, a small amount of fluid leaks against the check valve 76 into the center cavity. This results in a final pressure that is slightly higher than expected (slightly less pressure drop as indicated by the dashed line in FIG. 16). A valve 28 that is being closed very slowly (gradual slope) will tend to exhibit more leakage past the check valve 76, whereas a quick closing valve 28 (steep slope) tends to thrust the check valve 76 closed more quickly so it seals faster with less leakage. There is less chance for the check valve 76 to leak when the valve 28 is closing faster. A fast-closing valve 28 can help seat the seal of the check valve 76 faster. A slow-closing valve 28 exhibits a gradual change in pressure and can allow a check valve 76 to prolong its leak. Based on the difference between the solid line and the dashed line in FIG. 16, the system may display or provide an alert on the computer display 324, to the database 65, and/or to a remote device 63, for example, indicating that there may be an issue with the check valve 76 requiring attention or maintenance.

Computer Architecture

The present inventions can be realized in hardware, software, or a combination of hardware and software. In a specific embodiment, a system according to the present inventions can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general-purpose computer system with a computer program that, when being loaded and executed, controls the computer system such that it carries out the methods and inventions described herein.

The figures herein include block diagram and flowchart illustrations of methods, apparatus(s) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer I/O attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of the networks included within any devices or components discussed above.

Figure 18:
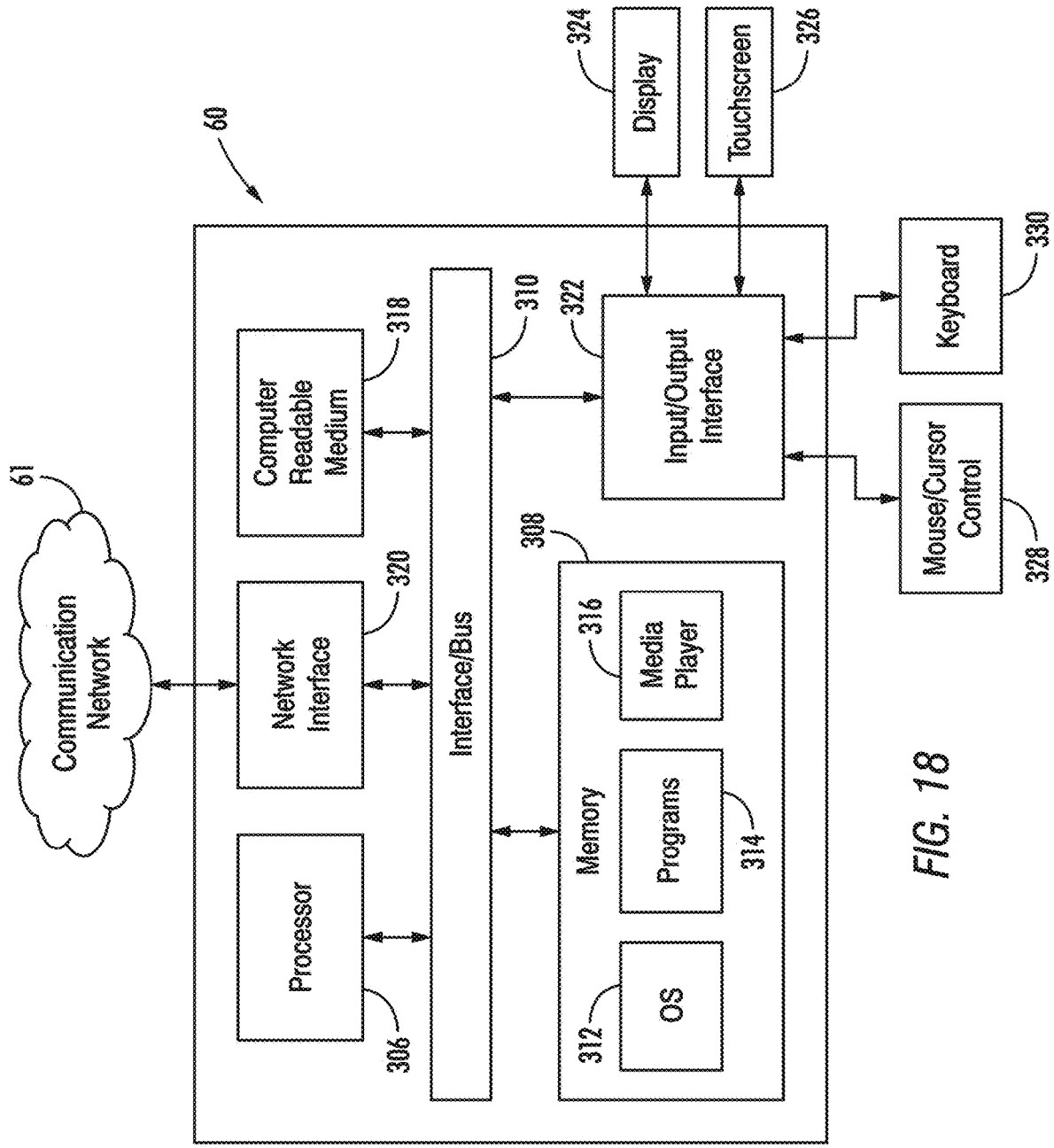
FIG. 18 diagram of a computer that may be used to implement various specific embodiments of the present inventions.

Referring now to FIG. 18, a diagram is shown illustrating an example of a computer 60 that may be used in connection with the present inventions. The computer 60 may include at least one processor 306 and at least one memory 308, each of which may be coupled to a local interface or bus 310.

An operating system 312 may be stored in the memory 308 and executable by the processor 306. Any variety of software programs 314 may also be stored in the memory 308 and executable by the processor 306. In a specific embodiment, examples of programs that may be stored in the memory 308 and executable by the processor 306 may include one or more programs that may implement the functionality described hereinabove in connection with FIGS. 1-17. A media player application 316 may be stored in the memory 308 and executable by the processor 306. Also stored in the memory 306 may be various forms of data, such as, for example, legal filings to be hyperlinked and legal authorities, such as court opinions.

The term "executable" as used herein means that a program file is of the type that may be run by the processor 306. In specific embodiments, examples of executable programs may include without limitation: a compiled program that can be translated into machine code in a format that can be loaded into a random access portion of the memory 308 and run by the processor 306; source code that may be expressed in proper format such as object code that is capable of being loaded into a random access portion of the memory 308 and executed by the processor 306; or source code that may be interpreted by another executable program to generate instructions in a random access portion of the memory 308 to be executed by the processor 306. An executable program may be stored in any portion or component of the memory 308 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 308 may include both volatile and nonvolatile memory and data storage components. Volatile components are those that do not retain data values upon loss of power. Nonvolatile components are those that retain data upon a loss of power. Thus, the memory 308 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the processor 306 may represent multiple processors 306 and/or multiple processor cores and the memory 308 may represent multiple memories 306 that operate in parallel processing circuits, respectively. In such a case, the local interface 310 may be an appropriate network that facilitates communication between any two of the multiple processors 306, between any processor 306 and any of the memories 308, or between any two of the memories 308, etc. The local interface 310 may comprise additional systems designed to coordinate this communication, including, for example, performing load balancing. The processor 306 may be of electrical or of some other available construction.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

The flowcharts of FIGS. 9, 11 and 12 shows the functionality and operation of various specific embodiments of certain aspects of the present inventions. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 306 in a computer system or other system. The machine code may be converted from the source code, etc. If embodied in hardware, each block may represent a circuit or a number of interconnected circuits to implement the specified logical function(s).

Although the flowcharts of FIGS. 9, 11 and 12 may show a specific order of execution, it is understood that the order of execution may differ from that which is depicted. For example, the order of execution of two or more blocks may be scrambled relative to the order shown. Also, two or more blocks shown in succession in FIGS. 9, 11 and 12 may be executed concurrently or with partial concurrence. Further, in some embodiments, one or more of the blocks shown in FIG. 9 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present inventions.

Any logic or application described herein that comprises software or code can be embodied in any non-transitory computer-readable medium, such as computer-readable medium 318 shown in FIG. 18, for use by or in connection with an instruction execution system such as, for example, a processor 306 in a computer system or other system. In this sense, the logic may comprise, for example, statements including instructions and declarations that can be fetched from the computer-readable medium 318 and executed by the instruction execution system. In the context of the present inventions, a "computer-readable medium" may include any medium that may contain, store, or maintain the logic or application described herein for use by or in connection with the instruction execution system.

The computer-readable medium 318 may comprise any one of many physical media such as, for example, magnetic, optical, or semiconductor media. More specific examples of a suitable computer-readable medium 318 would include, but are not limited to, magnetic tapes, magnetic floppy diskettes, magnetic hard drives, memory cards, solid-state drives, USB flash drives, or optical discs. Also, the computer-readable medium 318 may be a random access memory (RAM) including, for example, static random access memory (SRAM) and dynamic random access memory (DRAM), or magnetic random access memory (MRAM). In addition, the computer-readable medium 318 may be a read-only memory (ROM), a programmable read-only memory (PROM), an erasable programmable read-only memory (EPROM), an electrically erasable programmable read-only memory (EEPROM), or other type of memory device.

The computer 60 may further include a network interface 320 coupled to the bus 310 and in communication with the communication network 61. The network interface 320 may be configured to allow data to be exchanged between computer 60 and other devices attached to the communication network 61 or any other network or between nodes of any computer system. In addition to the above description of the communication network 61, it may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 320 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The computer 60 may also include an input/output interface 322 coupled to the bus 310 and also coupled to one or more input/output devices, such as a display 324, a touchscreen 326, a mouse or other cursor control device (e.g., television remote control) 328, and/or a keyboard 330. In certain specific embodiments, further examples of input/output devices may include one or more display terminals, keypads, touchpads, scanning devices, voice or optical recognition devices, or any other devices suitable for entering or accessing data by one or more computers 60. Multiple input/output devices may be present with respect to a computer 60 or may be distributed on various nodes of a computer system and/or any of the devices shown in the figures. In some embodiments, similar input/output devices may be separate from the computer 60 and may interact with the computer 60 or one or more nodes of computer system through a wired or wireless connection, such as through the network interface 320.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A valve system comprising:
   a valve, and a processor,
   the valve including a main body member, a valve member, a trunnion, and a pressure sensor,
   the main body member having a first port, a second port, an internal cavity, and an inner bore,
   the valve member including a valve plug, a first slip member and a second slip member,
   the valve plug having a transverse passageway adapted for alignment with the first port and the second port in an open position,
   the first slip member being secured to a first side of the valve plug and disposed for radial movement relative to the valve plug, the second slip member being secured to a second side of the valve plug and disposed and radial movement relative to the valve plug, the first slip member including a first slip member seal, the second slip member including a second slip member seal,
   the trunnion being connected to the valve plug, the trunnion being adapted to rotate the valve plug relative to the main body member, move the valve plug up and down relative to the main body member to cause movement of the first slip member and the second member into and out of sealing engagement with the inner bore,
   the first and second slip members being in a first position when the first and second slip member seals move into initial contact with the inner bore when the valve plug is moving from an open position to a closed position,
   the first and second slip members being in a second position when the first and second slip members and the first and second slip member seals move into fully seated engagement with the inner bore to define a closed position of the valve plug,
   the internal cavity of the main body member being initially sealed from the first port and second port in the main body member when the first slip member seal and the second slip member seal make initial sealing contact with the inner bore,
   the pressure sensor being mounted to the main body member and in communication with the internal cavity,
   the processor being adapted to determine a first pressure in the cavity when the first and second slip member seals make initial contact with the inner bore,
   the processor being adapted to determine a second pressure in the cavity when the first and second slip members and the first and second slip member seals move into fully seated engagement with the inner bore,
   the processor further being adapted to determine whether the second pressure is less than the first pressure, to provide an indication of a leak if the second pressure is not less than the first pressure, to determine whether the second pressure remains constant if the second pressure is less than the first pressure, to provide an indication of a leak if the second pressure does not remain constant, and to provide an indication of no leak if the second pressure remains constant.

2. The valve system of claim 1, where in the valve further includes a temperature sensor mounted to the main body and in communication with the internal cavity.

3. The valve system of claim 2, wherein the processor is adapted to:
   continuously monitor and record the internal cavity pressure when the valve is in its open position;
   detect and record the internal cavity pressure and the internal cavity temperature when the first and second slip member seals move into initial contact with the inner bore when the valve plug is moving from its open position to its closed position;
   detect and record the internal cavity pressure and the internal cavity temperature when the first and second slip member seals move into fully seated engagement with the inner bore;
   determine whether the internal cavity pressure is remaining constant;
   if the internal cavity pressure is remaining constant, then determine whether the internal cavity temperature is changing over time;
   if the internal cavity temperature is not changing over time, then provide an indication that the seals are not leaking;
   if the internal cavity temperature is changing over time, then provide an indication that at least one of the seals is leaking;
   if the internal cavity pressure is not remaining constant, then determine whether the change in internal cavity pressure is due to a change in internal cavity temperature only;
   if the change in internal cavity pressure is not due to a change in internal cavity temperature only, then provide an indication that at least one of the seals is leaking; and
   if the change in internal cavity pressure is due to a change in internal cavity temperature only, then provide an indication that the seals are not leaking.

4. The valve system of claim 3, wherein to perform the step of determining whether the change in internal cavity pressure is due to a change in the internal cavity temperature, the processor is adapted to:
 for a given detected internal cavity temperature and corresponding detected internal cavity pressure, determine what the expected internal cavity pressure corresponding to detected internal cavity temperature should be;
 compare the detected internal cavity pressure to the expected internal cavity pressure;
 if the expected internal cavity pressure equals the detected internal cavity pressure, then provide an indication that the seals are not leaking; and
 if the expected internal cavity pressure does not equal the detected internal cavity pressure, then provide an indication that the seals are leaking.

5. The valve system of claim 4, wherein to perform the step of determining what the expected internal cavity pressure corresponding to detected internal cavity temperature should be, the processor is adapted to:
 access from a database at least one fluid property of at least one of a fluid and a fluid mixture flowing through the valve; and
 use the at least one fluid property to determine the expected internal cavity pressure corresponding to the internal cavity temperature.

6. The valve system of claim 1, wherein the processor is adapted to:
 record an open-valve internal cavity pressure while the valve is in its open position;
 record a baseline internal cavity pressure at the moment the first and second seal members and the first and second slip member seals move into fully seated engagement with the inner bore of the valve;
 detect a later internal cavity pressure at some point in time after the first and second seal members and the first and second slip member seals move into fully seated engagement with the inner bore of the valve;
 determine a difference between the open-valve internal cavity pressure and the later internal cavity pressure;
 determine a difference between the open-valve internal cavity pressure and the baseline internal cavity pressure; and
 divide the difference between the open-valve internal cavity pressure and the later internal cavity pressure by the difference between the open-valve internal cavity pressure and the baseline internal cavity pressure and then multiply that amount by 100 to determine a remaining seal life percentage.

7. The valve system of claim 1, wherein the processor is adapted to:
 record a baseline internal cavity pressure after the valve moves into its closed position;
 detect and record an increase in internal cavity pressure in comparison to the baseline internal cavity pressure;
 record the start time that the increase in internal cavity pressure was first detected;
 record a test internal cavity pressure at a test time after the start time;
 determine and record a time interval between the start time and the test time;
 determine and record a pressure difference between the baseline internal cavity pressure and the test internal cavity pressure; and
 determine and record a leak rate by dividing the pressure difference by the time interval.

8. The valve system of claim 7, wherein the processor is adapted to:
 assign a leak severity value corresponding to the leak rate.

9. The valve system of claim 1, wherein:
 the valve includes a check valve; and
 the processor is adapted to:
 determine the rate of change of internal cavity pressure drop from the time the first and second slip member seals make initial contact with the inner bore of the valve to the time the first and second slip members and the first and second slip member seals make fully seated engagement with the inner bore of the valve;
 use the rate of change of internal cavity pressure drop to determine the extent to which the check valve is leaking when the valve is closing;
 use the extent of check valve leakage to determine whether the valve is closing at a desired rate; and
 provide an indication that the check valve is in need of maintenance.

10. A method for determining whether at least one slip member seal on a double block and bleed valve is leaking, the valve including an internal cavity, an inner bore, first and second slip members, and first and second slip member seals, comprising:
 determining a first pressure in the internal cavity when the first and second slip member seals make initial contact with the inner bore;
 determining a second pressure in the internal cavity when the first and second slip members and the first and second slip member seals move into fully seated engagement with the inner bore;
 determining whether the second pressure is less than the first pressure;
 providing an indication of a leak if the second pressure is not less than the first pressure;
 determining whether the second pressure remains constant if the second pressure is less than the first pressure;
 providing an indication of a leak if the second pressure does not remain constant; and
 providing an indication of no leak if the second pressure remains constant.

11. The method of claim 10, further comprising:
 determining a temperature in the internal cavity.

12. The method of claim 11, further comprising:
 continuously monitoring and recording the internal cavity pressure when the valve is in an open position;
 detecting and recording the internal cavity pressure and the internal cavity temperature when the first and second slip member seals move into initial contact with the inner bore when the valve plug is moving from its open position to its closed position;
 detecting and recording the internal cavity pressure and the internal cavity temperature when the first and second slip member seals move into fully seated engagement with the inner bore;
 determining whether the internal cavity pressure is remaining constant;
 if the internal cavity pressure is remaining constant, determining whether the internal cavity temperature is changing over time;
 if the internal cavity temperature is not changing over time, providing an indication that the seals are not leaking;
 if the internal cavity temperature is changing over time, providing an indication that at least one of the seals is leaking;

if the internal cavity pressure is not remaining constant, determining whether the change in internal cavity pressure is due to a change in internal cavity temperature only;

if the change in internal cavity pressure is not due to a change in internal cavity temperature only, providing an indication that at least one of the seals is leaking; and if the change in internal cavity pressure is due to a change in internal cavity temperature only, providing an indication that the seals are not leaking.

13. The method of claim 12, wherein the step of determining whether the change in internal cavity pressure is due to a change in the internal cavity temperature includes:

for a given detected internal cavity temperature and corresponding detected internal cavity pressure, determining what the expected internal cavity pressure corresponding to detected internal cavity temperature should be;

comparing the detected internal cavity pressure to the expected internal cavity pressure;

if the expected internal cavity pressure equals the detected internal cavity pressure, providing an indication that the seals are not leaking; and if the expected internal cavity pressure does not equal the detected internal cavity pressure, providing an indication that the seals are leaking.

14. The method of claim 13, wherein the step of determining what the expected internal cavity pressure corresponding to detected internal cavity temperature should be includes:

accessing from a database at least one fluid property of at least one of a fluid and a fluid mixture flowing through the valve; and using the at least one fluid property to determine the expected internal cavity pressure corresponding to the internal cavity temperature.

15. The method of claim 10, further comprising:

recording an open-valve internal cavity pressure while the valve is in its open position;

recording a baseline internal cavity pressure at the moment the first and second seal members and the first and second slip member seals move into fully seated engagement with the inner bore of the valve;

detecting a later internal cavity pressure at some point in time after the first and second seal members and the first and second slip member seals move into fully seated engagement with the inner bore of the valve;

determining a difference between the open-valve internal cavity pressure and the later internal cavity pressure;

determining a difference between the open-valve internal cavity pressure and the baseline internal cavity pressure;

dividing the difference between the open-valve internal cavity pressure and the later internal cavity pressure by the difference between the open-valve internal cavity pressure and the baseline internal cavity pressure and then multiply that amount by 100 to determine a remaining seal life percentage.

16. The method of claim 10, further comprising:

recording a baseline internal cavity pressure after the valve moves into its closed position;

detecting and recording an increase in internal cavity pressure in comparison to the baseline internal cavity pressure;

recording the start time that the increase in internal cavity pressure was first detected;

recording a test internal cavity pressure at a test time after the start time;

determining and recording a time interval between the start time and the test time;

determining and recording a pressure difference between the baseline internal cavity pressure and the test internal cavity pressure; and determining and recording a leak rate by dividing the pressure difference by the time interval.

17. The method of claim 16, further comprising:

assigning a leak severity value corresponding to the leak rate.

18. The method of claim 10, further comprising:

determining the rate of change of internal cavity pressure drop from the time the first and second slip member seals make initial contact with the inner bore of the valve to the time the first and second slip members and the first and second slip member seals make fully seated engagement with the inner bore of the valve;

using the rate of change of internal cavity pressure drop to determine the extent to which a check valve that is part of the valve is leaking when the valve is closing;

using the extent of check valve leakage to determine whether the valve is closing at a desired rate; and providing an indication that the check valve is in need of maintenance.

19. A double block and bleed valve comprising:

a main body member, a valve member, and a trunnion;

the main body member having a first port, a second port, an internal cavity, and an inner bore;

the valve member including a valve plug, a first slip member and a second slip member;

the valve plug having a transverse passageway adapted for alignment with the first port and the second port in an open position;

the first slip member being secured to a first side of the valve plug and disposed for radial movement relative to the valve plug, the second slip member being secured to a second side of the valve plug and disposed and radial movement relative to the valve plug, the first slip member including a first slip member seal, the second slip member including a second slip member seal;

the trunnion being connected to the valve plug, the trunnion being adapted to rotate the valve plug relative to the main body member, move the valve plug up and down relative to the main body member to cause movement of the first slip member and the second member into and out of sealing engagement with the inner bore; and a pressure sensor mounted to the main body member and in communication with the internal cavity.

20. The valve of claim 19, further including a temperature sensor mounted to the main body and in communication with the internal cavity.

* * * * *